United States Patent
Chen et al.

(10) Patent No.: US 11,153,874 B2
(45) Date of Patent: Oct. 19, 2021

(54) RELAY FOR ENHANCED MACHINE TYPE COMMUNICATION AND NARROW BAND-INTERNET OF THINGS

(71) Applicant: QUALCOMM Incorporated, San Diego, CA (US)

(72) Inventors: Wanshi Chen, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/592,438

(22) Filed: Oct. 3, 2019

(65) Prior Publication Data

US 2020/0037318 A1    Jan. 30, 2020

Related U.S. Application Data

(62) Division of application No. 15/409,197, filed on Jan. 18, 2017, now Pat. No. 10,477,540.

(Continued)

(51) Int. Cl.
*H04W 72/04* (2009.01)
*H04B 7/26* (2006.01)
(Continued)

(52) U.S. Cl.
CPC .... *H04W 72/0446* (2013.01); *H04B 7/15507* (2013.01); *H04B 7/15528* (2013.01);
(Continued)

(58) Field of Classification Search
CPC ....... H04W 4/70; H04W 72/02; H04W 72/04; H04W 72/0446; H04L 5/0092; H04L 5/16;
(Continued)

(56) References Cited

U.S. PATENT DOCUMENTS 8,705,419 B2   4/2014  Khandekar et al.
2008/0298296 A1  12/2008  Wu et al.
(Continued)

FOREIGN PATENT DOCUMENTS

CN    1992922 A    7/2007
CN   102113398 A    6/2011
(Continued)

OTHER PUBLICATIONS

International Search Report and Written Opinion—PCT/US2017/014167—ISA/EPO—dated May 10, 2017.
(Continued)

*Primary Examiner* — Kevin C. Harper
(74) *Attorney, Agent, or Firm* — Procopio, Cory, Hargreaves & Savitch LLP; Nerrie M. Zohn

(57) ABSTRACT

Coverage enhancement of an eMTC system may be limited if an MTC device switches from transmission mode to reception mode using subframes that may be utilized for transmissions or receptions. The present disclosure provides a mechanism by which a device may determine a set of valid subframes for use in communicating via a backhaul link, an access link, and/or a direct link. The present disclosure also provides a mechanism by which a device may switch between different communication link operations using subframes unavailable for transmitting and/or receiving data. The apparatus may receive repetition configuration information from a base station in direct communication with a UE. The apparatus may determine whether the base station is a relay node. The apparatus may determine a repetition configuration for communication between the base station and the UE based at least on the repetition configuration information and whether the base station is a relay node.

24 Claims, 14 Drawing Sheets

Related U.S. Application Data

(60) Provisional application No. 62/307,390, filed on Mar. 11, 2016.

(51) Int. Cl.
*H04B 7/155* (2006.01)
*H04W 76/14* (2018.01)
*H04W 4/70* (2018.01)
*H04W 88/08* (2009.01)

(52) U.S. Cl.
CPC .......... *H04B 7/2606* (2013.01); *H04W 76/14* (2018.02); *H04W 4/70* (2018.02); *H04W 88/08* (2013.01)

(58) Field of Classification Search
CPC .. H04B 7/155; H04B 7/5507; H04B 7/15528; H04B 7/204; H04B 7/2606
See application file for complete search history.

(56) References Cited

U.S. PATENT DOCUMENTS

| | | | |
|---|---|---|---|
| 2009/0059838 A1 | 3/2009 | Min et al. | |
| 2010/0316096 A1* | 12/2010 | Adjakple | H04L 1/1887 375/211 |
| 2011/0128893 A1 | 6/2011 | Park et al. | |
| 2013/0336202 A1 | 12/2013 | Oh et al. | |
| 2014/0328329 A1* | 11/2014 | Novlan | H04W 56/0015 370/336 |
| 2015/0085818 A1* | 3/2015 | Huang | H04L 5/0062 370/330 |
| 2015/0131579 A1* | 5/2015 | Li | H04L 1/1812 370/329 |
| 2015/0181583 A1 | 6/2015 | Siomina et al. | |
| 2015/0208415 A1 | 7/2015 | Xu et al. | |
| 2016/0165640 A1 | 6/2016 | Yang et al. | |
| 2017/0171841 A1* | 6/2017 | Chen | H04L 1/1854 |
| 2017/0265187 A1 | 9/2017 | Chen et al. | |
| 2017/0295554 A1* | 10/2017 | Lee | H04L 41/0803 |
| 2017/0325243 A1* | 11/2017 | Yasukawa | H04W 88/04 |
| 2018/0145819 A1 | 5/2018 | Axmon et al. | |
| 2018/0270008 A1* | 9/2018 | Yi | H04W 72/14 |
| 2018/0309544 A1 | 10/2018 | Hwang et al. | |

FOREIGN PATENT DOCUMENTS

| | | |
|---|---|---|
| CN | 103891171 A | 6/2014 |
| CN | 104619025 A | 5/2015 |
| EP | 3026830 A1 | 6/2016 |
| WO | 2011044558 A1 | 4/2011 |
| WO | 2015012664 A1 | 1/2015 |
| WO | 2015012666 A1 | 1/2015 |

OTHER PUBLICATIONS

Intel Corporation: "On UE Retuning Time of eMTC", 3GPP TSG-RAN WG4 Meeting #74bis, R4-152166, Rio de Janeiro, Brazil, Apr. 20-24, 2015 (Apr. 24, 2015), pp. 1-2.

Taiwan Search Report—TW106102034—TIPO—dated Apr. 16, 2020.

* cited by examiner

RELAY FOR ENHANCED MACHINE TYPE COMMUNICATION AND NARROW BAND-INTERNET OF THINGS

CROSS-REFERENCE TO RELATED APPLICATION(S)

This application is a divisional application of U.S. application Ser. No. 15/409,197, entitled "RELAY FOR ENHANCED MACHINE TYPE COMMUNICATION AND NARROW BAND-INTERNET OF THINGS" and filed on Jan. 18, 2017, which claims the benefit of U.S. Provisional Application Ser. No. 62/307,390, entitled "RELAY FOR ENHANCED MACHINE TYPE COMMUNICATION AND NARROW BAND-INTERNET OF THINGS" and filed on Mar. 11, 2016, each of which are expressly incorporated by reference herein in their entirety.

BACKGROUND

Field

The present disclosure relates generally to communication systems, and more particularly, to relays for enhanced machine type communication (eMTC) and narrow band-Internet of things.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A focus of wireless communication system design relates to the improvement of spectral efficiency, ubiquitous coverage, and enhanced quality of service (QoS) support, etc. Current wireless communication system downlink (DL) and uplink (UL) budgets may be designed for coverage of high end devices, such as state-of-the-art smartphones and tablets. However, it may be desirable to support low cost, low rate devices as well.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A focus of wireless communication system design relates to the improvement of spectral efficiency, ubiquitous coverage, and enhanced QoS support, etc. Current wireless communication system DL and UL budgets may be designed for coverage of high end devices, such as state-of-the-art smartphones and tablets. However, it may be desirable to support low cost, low rate devices as well. Among others, considerations regarding the provision of low-cost machine type communications (MTC) or eMTC may include a reduction in a maximum bandwidth, use of a single receive radio frequency (RF) chain, reduction in peak rate, reduction in transmit power, the performance of half duplex operation, etc. for such low cost, low rate devices. These devices may communicate using, for example, half duplex (HD) wireless communications.

In some cases, MTC devices may have reduced peak data rates (e.g., a maximum transport block (TB) size may be 1000 bits). Additionally, an MTC device may have rank 1 transmission and employ a single antenna for transmitting and receiving. This may limit an MTC device to HD communications (e.g., the device may not be capable of simultaneously transmitting and receiving). If an MTC device employs HD communications, the device may have a relaxed switching time (e.g., a switching time from transmission to reception, or vice versa). For example, a nominal switching time for a non-MTC device may be 20 μs, while a nominal switching time for an MTC device may be 1 ms. However, coverage enhancement of an eMTC system may be limited if an MTC device switches from transmission mode to reception mode using subframes that may be utilized for transmissions or receptions.

The present disclosure provides, among others, a mechanism by which a relay node and/or UE may determine a set of valid subframes for use in communicating via a backhaul link, an access link, and/or a direct link. In addition, the present disclosure provides a mechanism by which a relay node and/or UE may switch between backhaul link operations, access link operations, and/or direct link operations using subframes that are unavailable for transmitting and/or receiving data. Using the techniques described below, the present eMTC system may further enhance repetition level coverage for eMTC devices (e.g., UEs and/or relay nodes).

In an aspect of the disclosure, a method, a computer-readable medium, and an apparatus are provided for wireless communication using a relay node. For example, the apparatus may receive repetition configuration information from a base station in communication with the relay node. In addition, the apparatus may determine a backhaul repetition configuration for a backhaul link and an access link repetition configuration for an access link at the relay node based at least on the repetition configuration received from the base station.

In an additional aspect of the disclosure, a method, a computer-readable medium, and an apparatus are provided for wireless communication using a user equipment (UE). For example, the apparatus may receive repetition configuration information from a base station in direct communication with the UE. In an aspect, the apparatus may determine whether the base station is a relay node. In a further aspect, determine a repetition configuration for communication between the base station and the UE based at least on the repetition configuration information and whether the base station is a relay node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
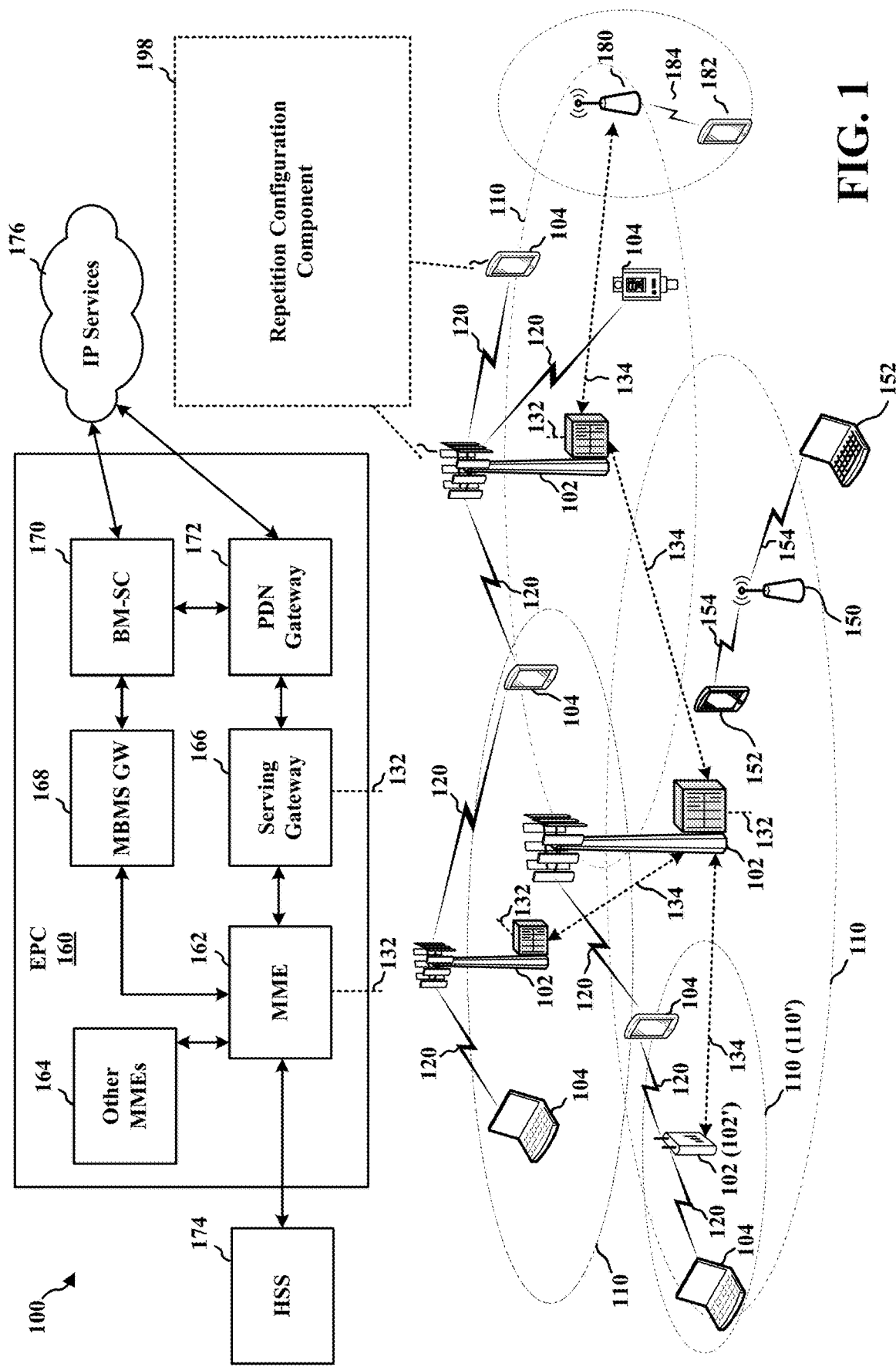
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include home base stations, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The wireless communications system and an access network 100 may include a millimeter wave (mmW) base station 180. In one aspect, the mmW base station 180 may be integrated with a base station. The mmW base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, an eMTC device or NB-IoT device (e.g., parking meter) or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 102/mmW base station 180 may include a repetition configuration component 198 configured to improve communications at a relay node and/or UE (e.g., eMTC/NB-IoT UE).

Figure 2:
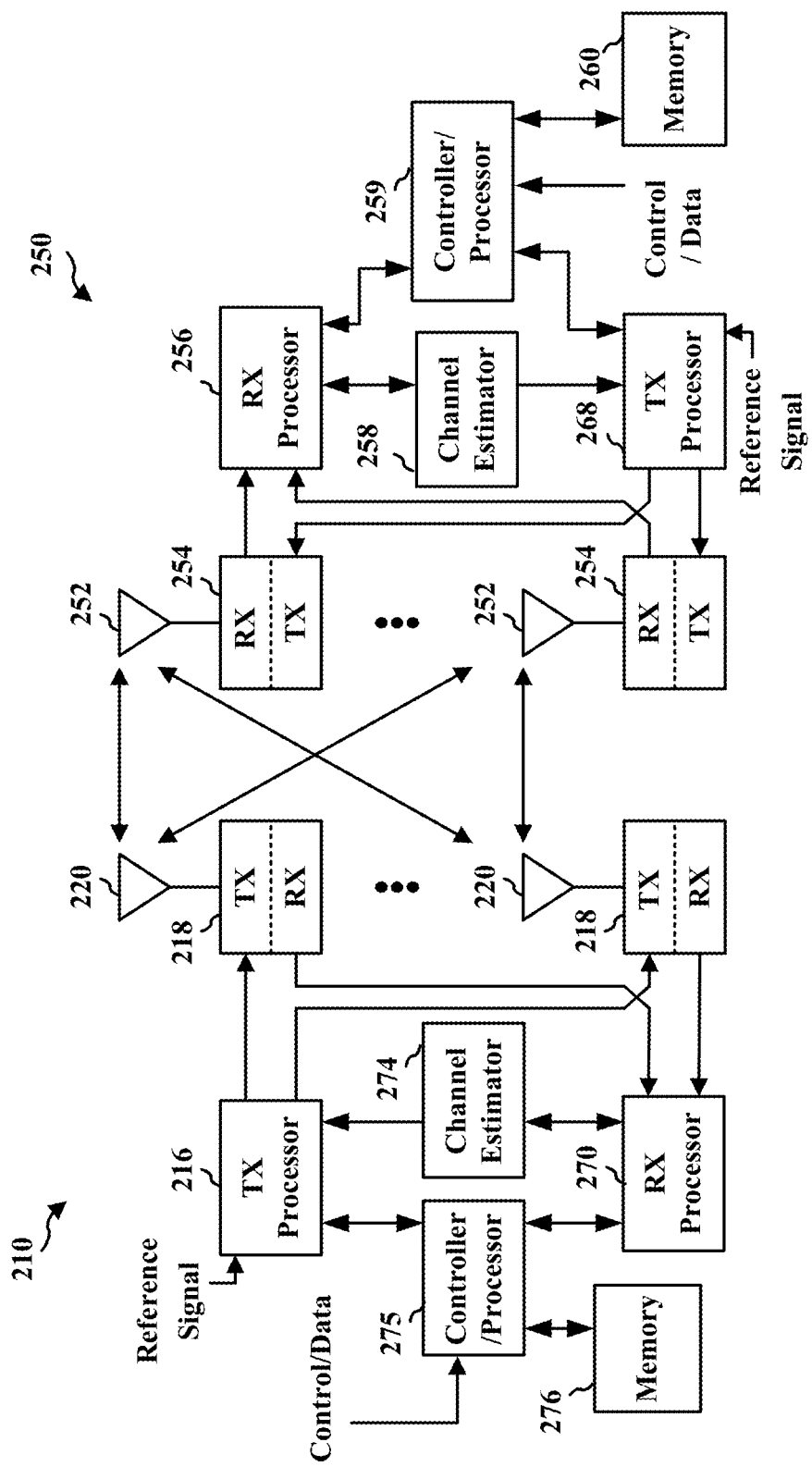
FIG. 2 is a diagram illustrating an example of a base station and UE in an access network.

FIG. 2 is a block diagram of a base station 210 in communication with a UE 250 in an access network. In one aspect, the base station 210 may be a base station providing a macro cell. In another aspect, the base station 210 may be a mmW base station. In yet another aspect, the base station 210 may include a mmW base station that is integrated with another base station, such as a base station providing a macro cell. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

The features described below generally relate to improved coverage enhancement techniques for a relay node in a wireless communications network. In some examples, a wireless communications network may employ automated communication such as MTC, eMTC and/or NB-IoT (e.g., communications provided without human intervention). In some cases, eMTC devices (e.g., UEs and/or relay nodes) may have limited capabilities. For example, while some eMTC devices may have broadband capacity, other eMTC devices may be limited to narrowband communications. A narrowband limitation may, for example, interfere with an ability of an eMTC device to receive control channel information using the full radio frequency spectrum bandwidth employed by a serving base station.

In some cases, MTC devices may have reduced peak data rates (e.g., a maximum TB size may be 1000 bits). Additionally, an MTC device may have rank 1 transmission and employ a single antenna for transmitting and receiving. This may limit an MTC device to HD communications (e.g., the device may not be capable of simultaneously transmitting and receiving). If an MTC device employs HD communications, the device may have a relaxed switching time (e.g., a switching time from transmission to reception, or vice versa). For example, a nominal switching time for a non-MTC device may be 20 μs, while a nominal switching time for an MTC device may be 1 ms.

In some instances, coverage enhancements of such MTC device may be employed to provide more reliable communications. eMTC operations in a wireless system may allow narrowband MTC devices to effectively operate within wider system bandwidth operations (e.g., 1.4 MHz, 3 MHz, 5 MHz, 10 MHz, 15 MHz, 20 MHz, etc.). For example, an MTC device may have a bandwidth limitation of 1.4 MHz bandwidth (e.g., 6 resource blocks according to certain multiple-access protocols, etc.), but communicate via one or more cells having a wider bandwidth (e.g., 3 MHz, 5 MHz, 10 MHz, 15 MHz, 20 MHz, etc.). In some instances, coverage enhancements of such eMTC devices may be employed to provide more reliable communications. Coverage enhancements may include, for example, power boosting (e.g., of up to 15 dB) and/or a bundling of transmission time intervals (TTIs) to provide redundant versions of a transmission.

Bundling of TTIs to enable a certain number of redundant versions of a transmission may be provided according to one or more repetition levels, which may include parameters stored and/or received at a device (e.g., a UE and/or relay node). In some examples, the bundling of TTIs according to a repetition level may be used to enhance coverage for certain channels, such as a physical channel (e.g., as defined by multiple-access protocols). For instance, various physical channels and/or associated messages may be repeatedly transmitted from a wireless communications device (e.g., UE and/or relay node). In addition, different channels may have a different number of repetitions (e.g., different repetition levels). In some cases, the number of repetitions (e.g., the number of redundant transmissions, etc.) may be on the order of tens of transmissions or more.

The present disclosure provides, among others, a mechanism by which a relay node and/or UE may determine a set of valid subframes for use in communicating via a backhaul link, an access link, and/or a direct link. In addition, the present disclosure provides a mechanism by which a relay node and/or UE may switch between backhaul link operations, access link operations, and/or direct link operations utilizing subframes that are unavailable for transmitting and/or receiving data. Using the techniques described below, the present wireless communications system may further enhance repetition level coverage for eMTC devices (e.g., UEs and/or relay nodes).

Although repetition level coverage enhancement techniques, including channel repetition, repetition level ramp-up, and transmit power ramp-up, may be employed with eMTC devices, other types of devices, such as NB-IoT devices, may likewise utilize or benefit from such techniques. Accordingly, those skilled in the art will recognize that the described repetition level coverage enhancement techniques are not limited to eMTC applications, and may also include NB-IoT applications.

Figure 3:
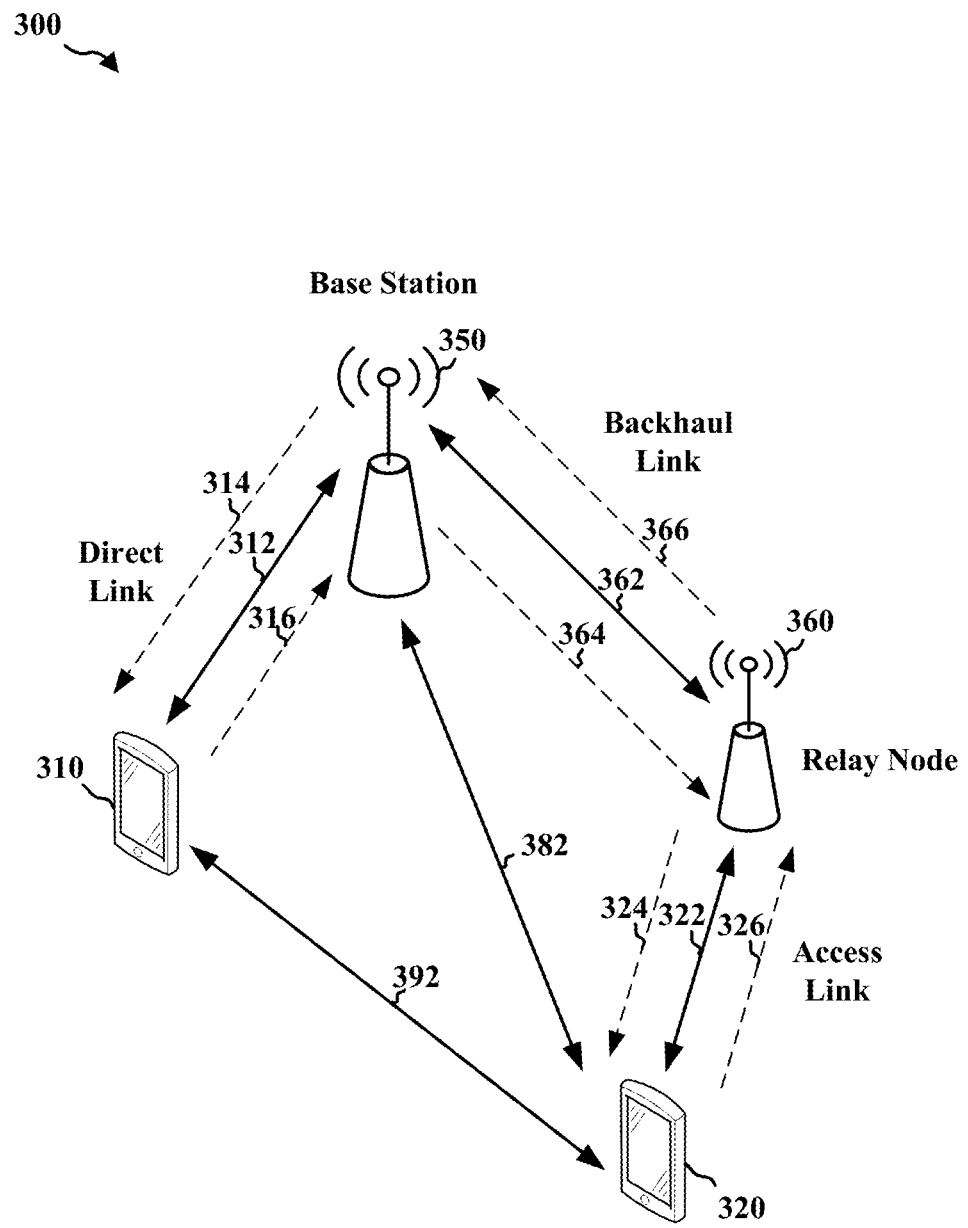
FIG. 3 illustrates an example diagram of a base station in communication with a relay node and UEs.

FIG. 3 illustrates a wireless communications system 300 including a base station 350 in direct communication with one or more of relay node 360, UE 310, and/or UE 320. In an aspect, base station 350 may communicate with UE 310 via a direct link 312 (e.g., using DL transmissions 314 and/or UL transmissions 316) and with relay node 360 via a backhaul link 362 (e.g., using DL transmissions 364 and/or UL transmissions 366). Additionally, relay node 360 may communicate with UE 320 via an access link 322 (e.g., using DL transmissions 324 and/or UL transmissions 326). In one aspect, DL transmissions 324 received at the relay node 360 from base station 350 may be relayed to UE 320 via access link 322. In a further aspect, base station 350 may communicate with UE 320 via direct link 382. Further, UE 310 may communicate (e.g., device-to-device communication) with UE 320 via direct link 392.

In one aspect, UE 310 may be a non-eMTC device, an eMTC device, or an NB-IoT device. As UE 310 may be an eMTC device or NB-IoT device, UE 310 may be configured with a narrow bandwidth channel as described above. Further, UE 320 may be an eMTC device or an NB-IoT device. When an eMTC/NB-IoT device is located a certain distance from base station 350, the UE (e.g., UE 320) may need to communicate with the network (e.g., base station 350) via the relay node 360 or UE 310 (e.g., acting as a relay node).

In one aspect, if UE 320 detects the presence of a non-eMTC/non-NB-IoT UE (e.g., UE 310), UE 320 may signal base station 350 via direct link 382 to turn off the relay node 360 and use UE 310 to act as a relay via direct link 392.

In an additional aspect, relay node 360 may transmit one or more discovery reference signals (DRSs), e.g., primary synchronization (PSS), secondary synchronization signal (SSS), common reference signal (CRS), channel state information-reference signal (CSI-RS), narrowband RS, etc., for UE 320 to discover and report to base station 350, such that relay node 360 may be managed dynamically (e.g., turning ON/OFF, etc.). For example, when base station 350 receives a message via direct link 382 indicating to turn OFF relay node 360 because a non-eMTC/non-NB-IoT device (e.g., UE 310) is also present, base station 350 may send a signal via backhaul link 362 instructing relay node 360 to turn OFF. In the OFF mode, the relay node 360 may still occasionally transmit a DRS.

In one aspect, relay node 360 may function as a network node (e.g., base station) without a wired backhaul. That is, backhaul link 362 may provide wireless backhaul connectivity between UE 320 and the rest of the network (e.g., base station 350). Relay node 360 may be an in-band or out-of-band relay node.

Relay node 360 may be categorized as an in-band relay node if the backhaul link 362 and the access link 322 operate on the same frequency. Alternatively, relay node 360 may be categorized as an out-of-band relay node if the backhaul link 362 and the access link 322 operate on different frequencies. Additionally, relay node 360 may be an L1, L2, or L3 relay node depending on the highest protocol layer supported by the relay node 360.

In one aspect, an L1 relay node, also known as a repeater, may amplify and forward a received transmission (e.g., an RF signal) from the base station 350 to the UE 320. An L1 relay node may not be able to differentiate between received signals and received noise/interference because an L1 relay node typically does not perform a decoding operation.

In a further aspect, an L2 relay node may decode and forward certain transmissions without modifying the end-to-end HARQ operation between the base station 350 and the UE 320. In addition, an L2 relay node may amplify certain transmissions to increase the chances of early decoding at the UE 320 (e.g., DL transmission 324) or at the base station 350 (e.g., UL 366).

In another aspect, an L3 relay node may provide functionality similar to base station 350 by using a wireless backhaul link and independent HARQ processes for communications with base station 350 using the backhaul link 362 and for communications with UE 320 using the access link 322. If more than one relay node (e.g., only one relay node is illustrated in FIG. 3) is present between the base station 350 and the UE 320, independent HARQ processes may be used by each of the relay nodes for communications between the relay nodes.

In addition, relay node 360 may be categorized as transparent (e.g., the UE 320 is unable to detect the presence of the relay node 360) or non-transparent (e.g., the UE 320 can detect the presence of the relay node 360). If relay node 360 is an L1 relay node or an L2 relay node, the relay node 360 may not have a network identity and therefore be transparent to the UE 320. However, if relay node 360 is an L3 relay node, the relay node 360 may have a network identity (e.g., similar to a regular network base station) and therefore be non-transparent to the UE 320. In one aspect, the UE 320 may determine that relay node 360 is a relay node and not a direct link base station (e.g., base station 350) based on the network identity. Further, if relay node 360 is non-transparent, relay node 360 may transmit regular synchronization signals.

Additionally, relay node 360 may be configured for HD operations or a full-duplex (FD) operations. Categorizing a relay node as an HD relay node or an FD relay node may be relevant for in-band relays where backhaul link 362 communication takes places on the same frequency as access link 322 communication.

As described previously, an HD relay node (e.g., relay node 360) may not be capable of simultaneously transmitting and receiving. In other words, relay node 360 may, at a given time, either send DL transmission(s) 324 to UE 320 via access link 322 or monitor for DL transmission(s) 364 from the base station 350 via backhaul link 362. Similarly, an HD relay node (e.g., relay node 360) may send UL transmission(s) 366 to base station 350 via backhaul link 362 or monitor for UL transmission(s) 326 from UE 320 via access link 322.

When relay node 360 is configured for HD operations, one or two (e.g., at least one) symbols in one or more subframes or one or more subframes may not be available for transmitting and/or receiving via the backhaul link or the access link to allow time for switching between the backhaul link and the access link. However, in an additional aspect, the exclusion of the first one or two symbols may not be required for every subframe. The relay node 360 may signal to the UE 320 which symbol(s) and/or subframes are unavailable for UL transmissions 326.

Alternatively, a relay node configured for FD operations may be capable of simultaneously transmitting and receiving at the same time on different links (e.g., the backhaul link 362 and the access link 322). For example, if the relay node 360 is an FD relay node, relay node 360 may rely on spatial separation between the access link 322 and the backhaul link 362 (e.g., by antenna directivity or antenna location for both links) and/or on interference cancellation capabilities to simultaneously transmit and receive on the backhaul link 362 and the access link 322.

As described above, eMTC operations in a wireless communications system may allow narrowband MTC devices and/or eMTC devices (e.g., UEs 310, 320 and/or relay node 360) to effectively operate within wider system bandwidth operations (e.g., 1.4 MHz, 3 MHz, 5 MHz, 10 MHz, 15 MHz, 20 MHz, etc.). For example, one or more of UEs 310, 320 may have a bandwidth limitation of 1.4 MHz bandwidth (e.g., 6 resource blocks according to certain multiple-access protocols, etc.), but communicate via one or more cells having a wider bandwidth (e.g., 3 MHz, 5 MHz, 10 MHz, 15 MHz, 20 MHz, etc.).

In some instances, coverage enhancements for the UEs 310, 320 and/or relay node 360 may be employed to provide more reliable communications. Coverage enhancements may include, for example, repeating transmissions, power boosting (e.g., of up to 15 dB), TTI bundling, and/or frequency hopping in an UL physical channel 316, 326, 366 to provide redundant versions of a transmission.

In an aspect, repetition configuration information may be used by the UE 320 and/or relay node 360 to provide redundant versions of a transmission and thus more reliable communications within wireless communications system 300. In one aspect, repetition configuration information may be signaled by the base station 350 to one or more of UE 310, UE 320, and/or relay node 360 that includes one or more of a set of valid subframes that may be used for transmissions to the base station 350, a set of narrowband frequency channels, repetition levels, and/or any combination thereof.

The repetition configuration information may be sent by base station 350 as a broadcast transmission or a unicast transmission. In an aspect, the repetition configuration information may be transmitted and/or broadcast by base station 350 in a system information block (SIB). SIBs may carry relevant information that enables a UE (e.g., UE 310, 320) to access a cell (e.g. base station 350) for communication with the network.

In one aspect, the SIB may include two-bits of information that indicates the repetition configuration information. For example, a value of 01 transmitted in the SIB may indicate a repetition level (e.g., the number of repeat transmissions that are supported) of ten for relay node 360 and/or a repetition level of twenty for one or more of UEs 310, 320.

Additionally and/or optionally, separate information fields in the SIB may be used for indicating the repetition configuration information to relay node 360 and/or UE 310, 320. In an additional aspect, the repetition configuration information may be received by relay node 360 in a relay node specific configuration message over-the-air or over backhaul link 362, or in combination with an SIB. Additionally and/or alternatively, the repetition configuration information may be received at UE 320 from base station 350 via direct link 382. In an aspect, the repetition configuration information received by UE 320 via direct link 382 may be used for communications with base station 350 or relay node 360. In one aspect, repetition configuration information for direct link 382 may be different than the backhaul repetition configuration for the backhaul link 362.

In an aspect, base station 350 may transmit repetition configuration information to UE 310 (e.g., if UE 310 is an eMTC or NB-IoT UE), UE 320 (e.g., if the base station 350 is communicating with UE 320 via direct link 382), and/or relay node 360. However, the repetition configuration information transmitted by base station 350 may be interpreted differently by UE 310, UE 320, and relay node 360 due to the differences in capabilities between UE 310, UE 320, and relay node 360. For instance, UEs 310, 320 may have one receive antenna and relay node 360 may have two receive antennas, relay node 360 may be closer to base station 350 than UE 310 and/or relay node 360 may not need as many repetitions as UE 310.

Relay node 360 may use the repetition configuration information received from base station 350 to determine a valid set of subframes (e.g., $Y_{ch}$) for transmitting and/or repeating transmissions using backhaul link 362 (e.g., DL 364 and UL 366) and/or access link 322 (e.g., DL 324 and UL 326). Further, relay node 360 may determine a valid set of subframes that may be used by UE 320 for communicating with base station 350 via direct link 382. In addition, relay node 360 may signal the repetition configuration information to the UE 320. In one aspect, the signaling method used by the relay node 360 to indicate the valid set of subframes to the UE 320 may be different than a signaling method used by a base station located in a cell without a relay node. For example, due to the impact of backhaul link 362 subframe partitioning, the relay node 360 may use a 40-bit bitmap to indicate subframe availability for FDD to the UE 320. Alternatively, a base station located in a cell without a relay node (e.g., and therefore is not impacted by backhaul link subframe partitioning), may indicate subframe availability using a 10-bit bitmap. In one aspect, backhaul DL subframes may configured with a periodicity of 8 ms (e.g., with each subframes being 1 ms in duration) excluding subframes that cannot be declared as MBSFN subframes by the RN (e.g., in FDD, subframes 0/4/5/9 may not be configured as MBSFN, while in time division duplex (TDD), subframes 0/1/5/6 may not be configured as MBSFN).

In another aspect, UE 320 may perform frequency hopping to send transmissions using UL access link 326 by hopping between different frequency channels to exploit the frequency diversity of the wideband channel used in multiple-access technologies to provide coverage enhancement. Relay node 360 may enable frequency hopping at the UE 320 based on the sets of narrowband frequency channels and/or frequency hopping parameters determined from repetition configuration information received from base station 350.

Frequency hopping may be enabled at UE 320 in order to enhance frequency diversity for a TB transmission involving a large number of subframes. For example, UE 320 may hop between different frequency channels (e.g., frequency hopping) to monitor, receive, and/or transmit signals to provide coverage enhancement (e.g., to exploit the frequency diversity of the wideband channel). In other words, the UE 320 may transmit a TB to the relay node 360 in a first narrowband using the valid set of subframes (e.g., $Y_{ch}$ subframes) associated with the access link 322, before hopping to a different narrowband and transmitting the TB using the valid set of subframes. Frequency hopping parameters, such as the narrowband frequency channels and the number of $Y_{ch}$ subframes used for TB repetition on each narrowband frequency channel, may be managed separately based on a coverage enhancement (CE) mode described below and/or system type (e.g., FDD vs. TDD).

In one aspect, the $Y_{ch}$ subframes defined for a TDD UE may be used or adapted for a FDD HD relay node because the partitioning of backhaul and access links makes a FDD relay node operate similar to a TDD node. In an additional aspect, the relay node 360 may use a 10 ms based resource partitioning for FDD instead of an 8 ms resource partitioning, and a 10 ms HARQ round trip time (RTT) may also be considered in the backhaul link 362 and/or access link 322.

For eMTC, where UE 320 is configured with one of coverage enhancement (CE) mode A or CE mode B, the following values of $Y_{ch}$ may be defined:
CE mode A: FDD: $Y_{ch}$={1, 2, 4, 8}, TDD: $Y_{ch}$={1, 5, 10, 20}; and
CE mode B: FDD: $Y_{ch}$={2, 4, 8, 16}, TDD: $Y_{ch}$={5, 10, 20, 40}.

Additionally, the relay node 360 may signal to the UE 320 information associated with a valid set of subframes that may be used for DL or UL transmissions (e.g., TB transmissions) on the access link 322. In one aspect, the information associated with the valid set of subframes may be included in the repetition configuration information signaled by the base station 350. The valid set of subframes may be used by the UE 320 and/or relay node 360 for repeating a transmission or sending a new transmission. In an aspect, the valid set of subframes for DL and UL transmissions on the access link 322 (e.g., transmissions between the relay node 360 and the UE 320) may be configured based on a subframe configuration associated with the backhaul link 362 (e.g., transmission between the base station 350 and the relay node 360). In other words, a repetition level corresponding to a backhaul repetition configuration may be different from a repetition level corresponding to an access link repetition configuration. The difference in repetition levels between the backhaul link 362 and the access link 322 may be due to HARQ processes that are performed for DL transmissions 364 received at the relay node 360. For example, not all subframes may be valid for use by the UE 320 in sending UL transmissions 326 because the relay node 360 may use one or more UL subframes to transmit HARQ responses to base station 350, as discussed below with respect to FIGS. 4-6.

Figure 4:
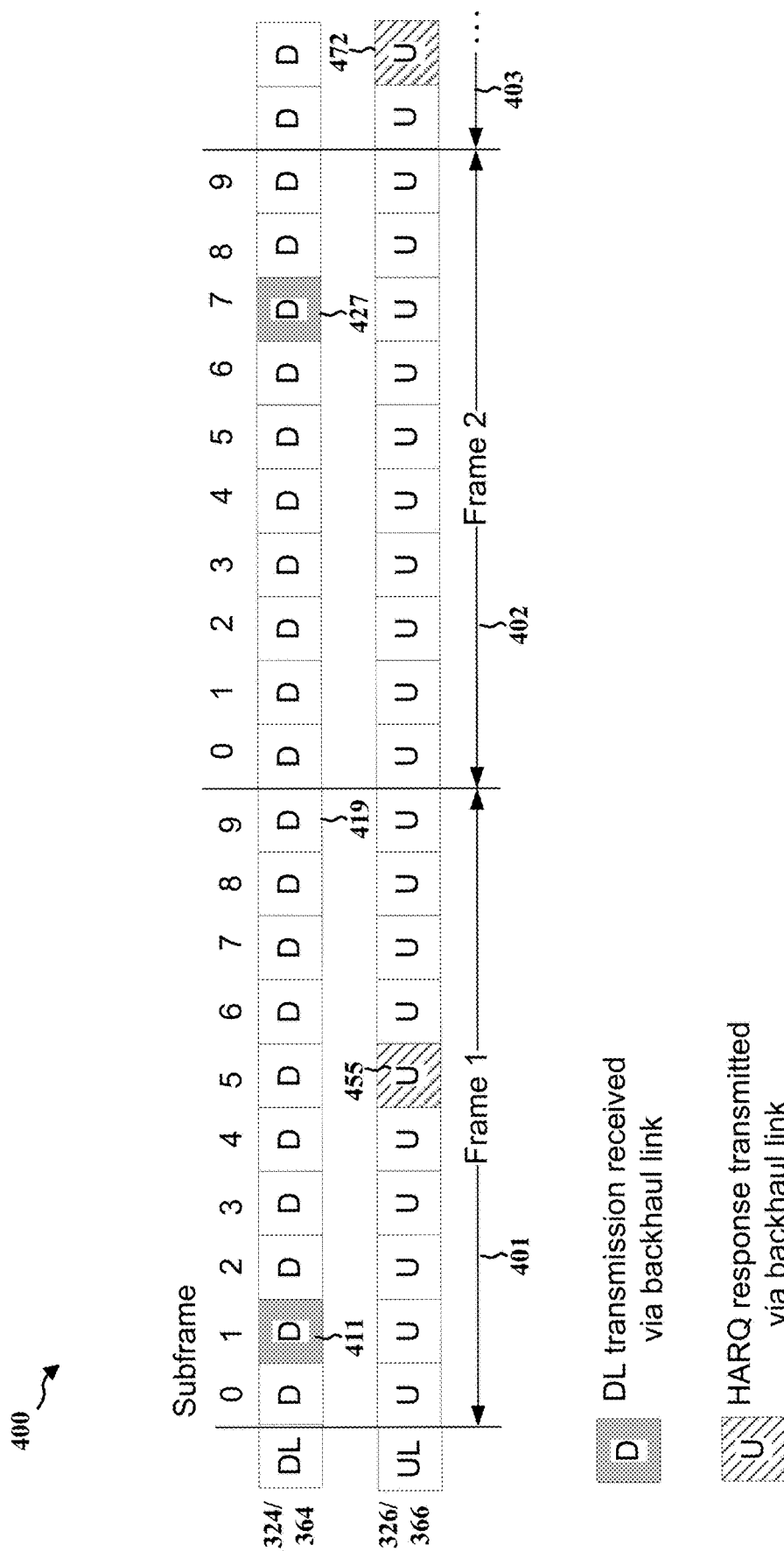
FIG. 4 illustrates an example subframe configuration for backhaul and access links in accordance with one aspect of the present disclosure.

FIG. 4 illustrates an example subframe configuration 400 for use by a relay node operating in HD mode. For example, subframe configuration 400 may be used by relay node 360 (e.g., described above with reference to FIG. 3) receiving backhaul DL transmissions 364 from base station 350 and receiving access link UL transmissions 326 from UE 320.

In one aspect, a single HARQ process may be configured for the backhaul link at relay node 360. For example, relay node 360 may receive a DL transmission 364 in subframe 1 411 of frame 1 401 and send a HARQ response (e.g., acknowledgement (ACK) and/or negative ACK (NACK)) to base station 350 at n+4$^{th}$ subframe in a backhaul UL transmission 366. That is, the HARQ process associated with the DL transmission 364 received in subframe 1 411 may be transmitted by the relay node 360 (e.g., to base station 350) in a UL transmission 366 using of the backhaul link 362 at subframe 5 455 of frame 1 401. Therefore, UL subframe 5 455 may be unavailable for use in sending an access link UL transmission 326 by the UE 320.

Further, as the HARQ process may be configured with the periodicity of 8 ms (e.g., and each subframe being 1 ms in duration), the next subframe that may be configured for a DL transmission 364 associated with the HARQ process on the backhaul link 362 is subframe 9 419. However, as discussed above, since subframe 9 419 may not be configured as an MBSFN subframe, subframe 9 419 may not be used for sending a backhaul DL transmission 364. As a result, the next subframe that may be configured for the HARQ process is subframe 7 427 of frame 2 402 (e.g., based on a configured periodicity of 8 ms). Since the HARQ response may be sent at the n+4$^{th}$ subframe, the relay node 360 may send a HARQ response in subframe 1 472 of frame 3 403. Thus, subframe 1 472 in frame 3 403 may be unavailable to UE 320 for use in sending an access link UL transmission.

Figure 5:
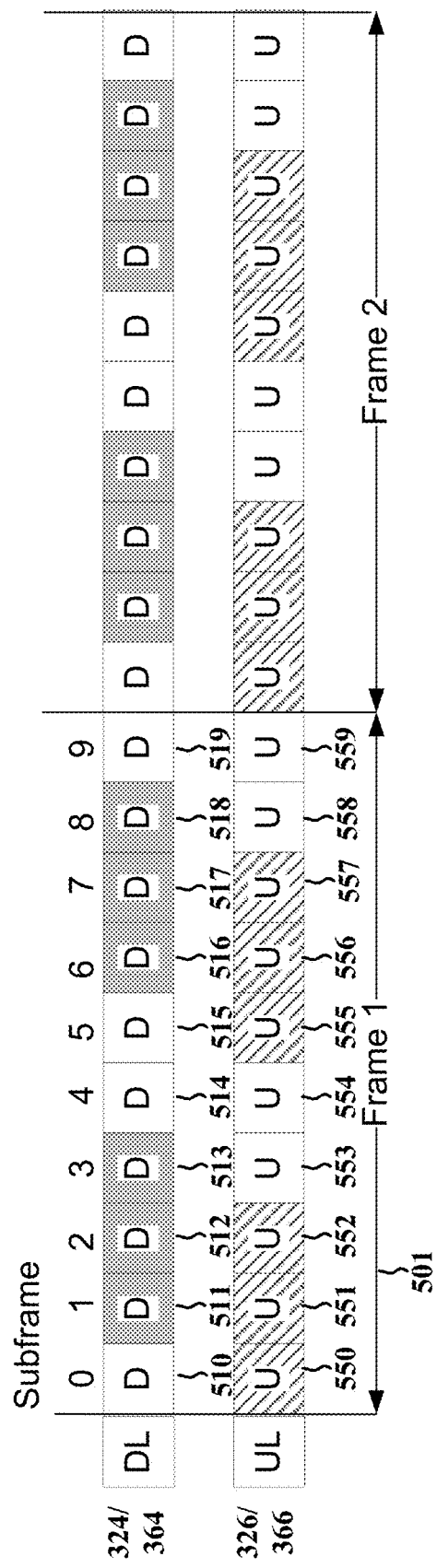
FIG. 5 illustrates an additional example subframe configuration for backhaul and access links in accordance with one aspect of the present disclosure.

FIG. 5 illustrates an additional example subframe configuration 500 for use by a relay node operating in HD mode. For example, subframe configuration 500 may be used by relay node 360 (e.g., described above with reference to FIG. 3) receiving backhaul DL transmissions 364 from base station 350 and receiving access link UL transmissions 326 from UE 320.

In an example aspect, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and/or backhaul DL HARQ transmissions.

Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., as described above), if subframes 4 or 9 are used for the backhaul link 362 or the access link 322, two adjacent subframes may not be available for another one of the backhaul link 362 or the access link 322.

In another example aspect, the unavailability of symbols and/or subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

Figure 6:
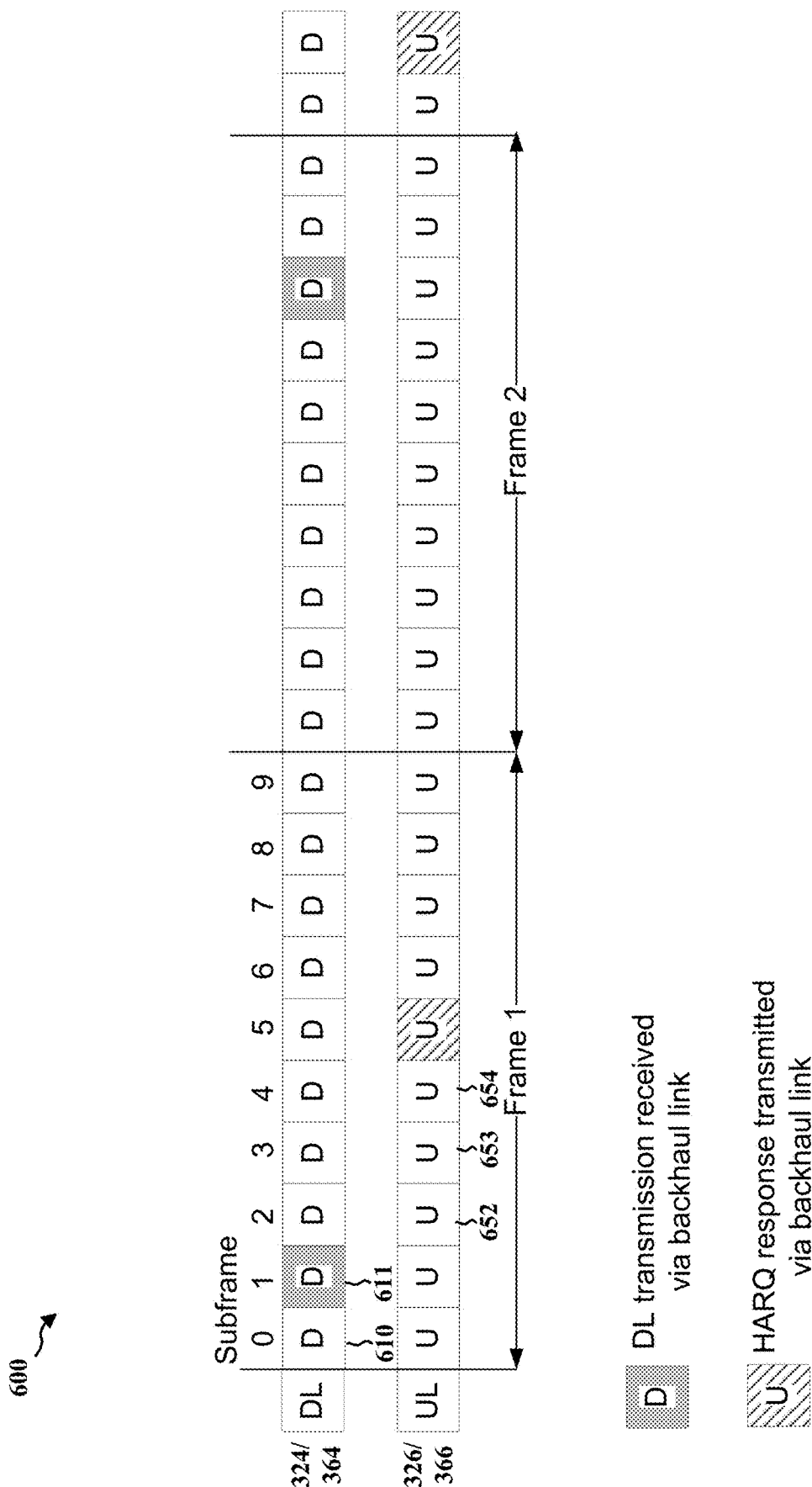
FIG. 6 illustrates an additional example subframe configuration for backhaul and access links in accordance with one aspect of the present disclosure.

FIG. 6 illustrates an additional example subframe configuration 600 for use by a relay node operating in HD mode. For example, subframe configuration 600 may be used by relay node 360 (e.g., described above with reference to FIG. 3) receiving backhaul DL transmissions 364 from base station 350 and receiving access link UL transmissions 326 from UE 320.

In an aspect, subframe 0 610 may be used for access link 322 DL transmissions and subframe 2 652, subframe 3 653, and subframe 4 654 may be used for access link 322 UL transmission so that subframe 1 611 may be used to facilitate switching for eMTC/NB-IoT UEs (e.g., that is, relay node 360 may perform DL backhaul reception during subframe 1 611).

Figure 7A:
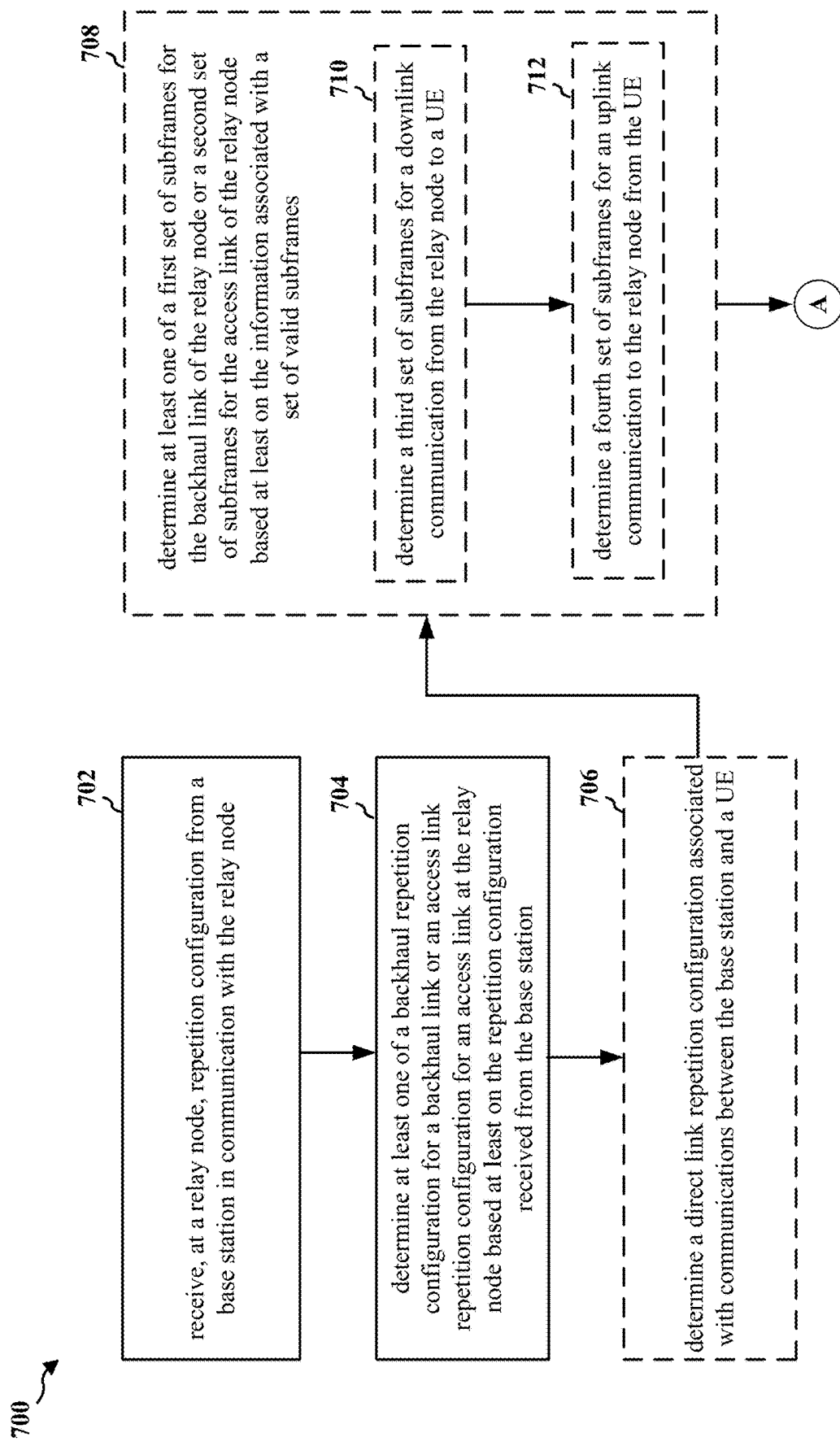
FIGS. 7A and 7B are a flow chart illustrating a method of wireless communications at a relay node in accordance with one aspect of the present disclosure.
Figure 7B:
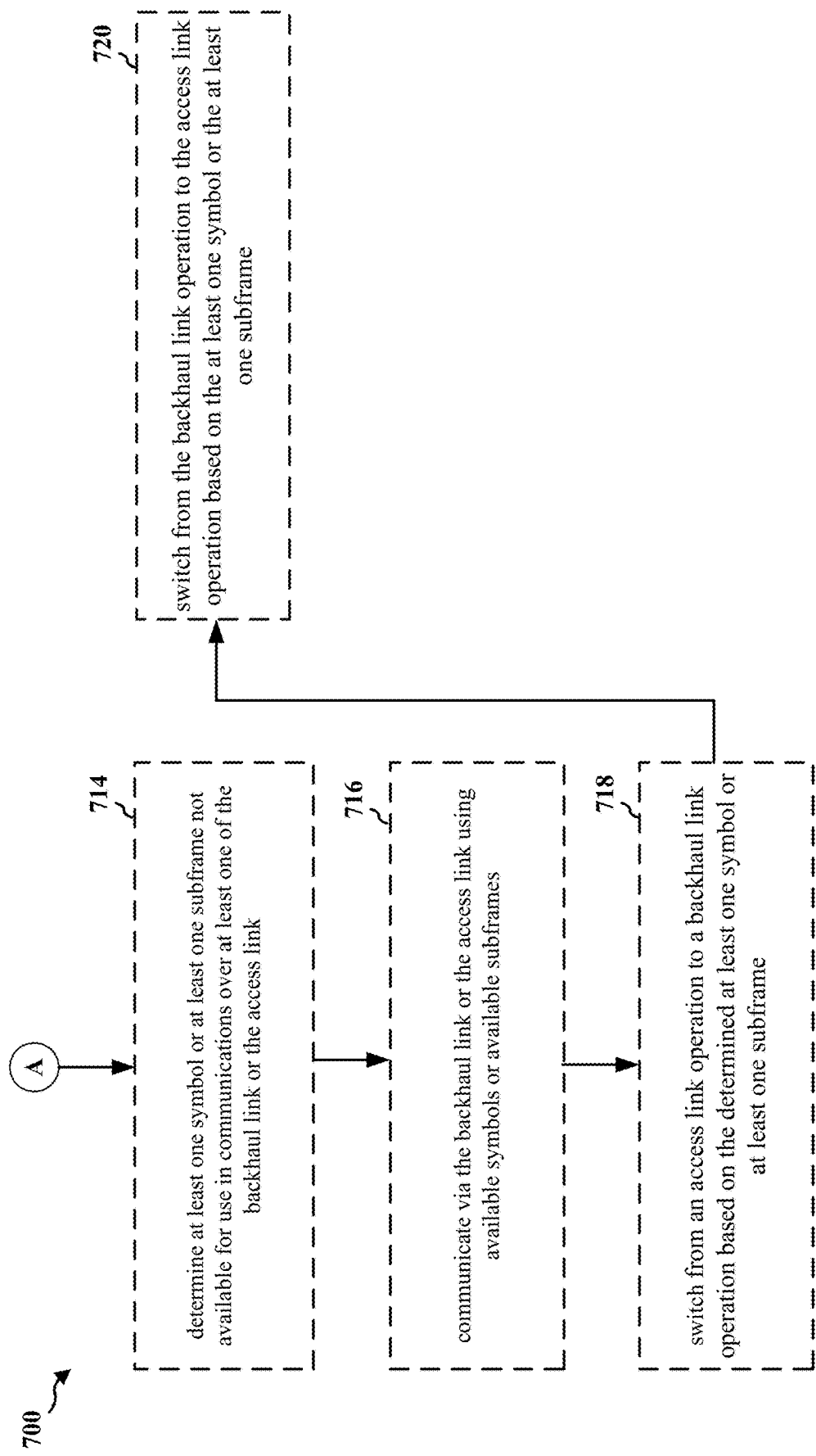

FIGS. 7A and 7B are a flowchart 700 of a method of wireless communication. The method may be performed by a relay node (e.g., the relay node 360, the apparatus 802/802'). Operations indicated with dashed lines represent optional operations for various aspects of the disclosure.

As seen in FIG. 7A, at 702, the relay node may receive repetition configuration from a base station in communication with the relay node. In an aspect, the repetition configuration received at the relay node may include information related to one or more a set of valid subframe for use in communication via one or more of the backhaul link or the access link, a set of narrowband frequency channels, frequency hopping parameters, or repetition levels. In another aspect, the repetition configuration may be received in an SIB, a relay node-specific configuration, or a combination thereof. In a further aspect, the repetition levels may be associated with at least one of a downlink relay control channel, a downlink relay shared channel, an uplink relay control channel, or an uplink relay shared channel. Further, the relay node may be a half-duplex relay node. In another aspect, the relay node is an eMTC node or a NB-IoT node. For example, referring to FIG. 3, The repetition configuration information may be sent by base station 350 as a broadcast transmission or a unicast transmission. In an aspect, the repetition configuration information may be transmitted and/or broadcast by base station 350 in a SIB. SIBs carry relevant information that may enable a UE (e.g., UE 310, 320) to access a cell (e.g. base station 350) for communication with the network. In one aspect, the SIB may include two-bits of information that indicates the repetition configuration information. For example, a value of 01 transmitted in the SIB may indicate a repetition level (e.g., the number of repeat transmissions that are supported) of ten for relay node 360 and/or a repetition level of twenty for one or more of UEs 310, 320. Additionally and/or optionally, separate information fields in the SIB may be used for indicating the repetition configuration information to relay node 360 and/or UE 310, 320. In an additional aspect, the repetition configuration information may be received by relay node 360 in a relay node specific configuration message over-the-air or over backhaul link 362, or in combination with an SIB. Additionally and/or alternatively, the repetition configuration information may be received at UE 320 from base station 350 via direct link 382. In an aspect, the repetition configuration information received by UE 320 via direct link 382 may be used for communications with base station 350 or relay node 360. In one aspect, repetition configuration information for direct link 382 may be different than the backhaul repetition configuration for the backhaul link 362.

At 704, the relay node may determine at least one of a backhaul repetition configuration for a backhaul link or an access link repetition configuration for an access link at the relay node based at least on the repetition configuration received from the base station. In an aspect, a first repetition level corresponding to the backhaul repetition configuration is different from a second repetition level corresponding to the access link repetition configuration. For example, referring to FIG. 3, relay node 360 may use the repetition configuration information received from base station 350 to determine a valid set of subframes (e.g., $Y_{ch}$) for transmitting and/or repeating transmissions using backhaul link 362 (e.g., DL 364 and UL 366) and/or access link 322 (e.g., DL 324 and UL 326). In one aspect, the $Y_{ch}$ subframes defined for a TDD UE may be used or adapted for a FDD HD relay node because the partitioning of backhaul and access links makes a FDD relay node operate similar to a TDD node. In an additional aspect, the relay node 360 may use a 10 ms based resource partitioning for FDD instead of an 8 ms resource partitioning, and a 10 ms HARQ round trip time (RTT) may also be considered in the backhaul link 362 and/or access link 322. For eMTC, where UE 320 is configured with one of coverage enhancement (CE) mode A or CE mode B, the following values of $Y_{ch}$ may be defined: CE mode A: FDD: $Y_{ch}=\{1, 2, 4, 8\}$, TDD: $Y_{ch}=\{1, 5, 10, 20\}$; and CE mode B: FDD: $Y_{ch}=\{2, 4, 8, 16\}$, TDD: $Y_{ch}=\{5, 10, 20, 40\}$.

At 706, the relay node may determine a direct link repetition configuration associated with communications between the base station and a UE. In an aspect, the UE may be one of an eMTC UE or a NB-IoT UE in direct communication with the base station. In another aspect, the determined direct link repetition configuration may be different than the backhaul repetition configuration. For example, referring to FIG. 3, relay node 360 may determine a valid set of subframes that may be used by UE 320 for communicating with base station 350 via direct link 382.

At 708, the relay node may determine at least one of a first set of subframes for the backhaul link of the relay node or a second set of subframes for the access link of the relay node based at least on the information associated with the set of valid subframes. For example, referring to FIG. 4, as the HARQ process may be configured with the periodicity of 8 ms (e.g., and each subframe being 1 ms in duration), the next subframe that may be configured for a DL transmission 364 associated with the HARQ process on the backhaul link 362 is subframe 9 419. However, as discussed above, since subframe 9 419 may not be configured as an MBSFN subframe, subframe 9 419 may not be used for sending a backhaul DL transmission 364. As a result, the next subframe that may be configured for the HARQ process is subframe 7 of frame 2 427 (e.g., based on a configured periodicity of 8 ms). Since the HARQ response may be sent at the n+4$^{th}$ subframe, the relay node 360 may send a HARQ response in subframe 1 472 of frame 3 403. Thus, subframe 1 472 in frame 3 403 may be unavailable to UE 320 for use in sending an access link UL transmission. Referring to FIG. 5, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and thus backhaul DL HARQ transmissions. Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., 1 ms), if subframes 4 or 9 are used for the backhaul link 362 or the access link 322, two adjacent subframes may not be used for another one of the backhaul link 362 or the access link 322. In another example aspect, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

At 710, the relay node may determine the second set of subframes by determining a third set of subframes for a downlink communication from the relay node to a UE. For example, referring to FIG. 5, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and thus backhaul DL HARQ transmissions. Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., 1 ms), if subframes 4 or 9 are used for the backhaul link 362 or the access link 322, two adjacent subframes may not be used for another one of the backhaul link 362 or the access link 322. In another example aspect, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

At 712, the relay node may determine the second set of subframes by determining a fourth set of subframes for an uplink communication to the relay node from the UE. In an aspect, the UE is an eMTC UE or a NB-IoT UE. For example, referring to FIG. 5, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and thus backhaul DL HARQ transmissions. Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., 1 ms), if subframes 4 or 9 are used for the backhaul link 362 or the access link 322, two adjacent subframes may not be used for another one of the backhaul link 362 or the access link 322. In another example aspect, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

As seen in FIG. 7B, at 714, the relay node may determine at least one symbol in a subframe not available for use in communicating over at least one of the backhaul link or the access link. For example, referring to FIG. 3, when relay node 360 is configured for HD operations, one or two (e.g., at least one) symbols in one or more subframes may not be available for transmitting and/or receiving via the backhaul link or the access link to allow time for switching between the backhaul link and the access link. However, in an additional aspect, the exclusion of the first one or two symbols may not be required for every subframe. The relay node 360 may signal to the UE 320 which symbol(s) in which subframes are unavailable for UL transmissions 326. In addition, referring to FIG. 5, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and thus backhaul DL HARQ transmissions. Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., 1 ms), if subframes 4 or 9 are used for the backhaul link 362 or the access link 322, two adjacent subframes may not be used for another one of the backhaul link 362 or the access link 322. In another example aspect, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

At 716, the relay node may communicate via the backhaul link or the access link using available symbols or available subframes. For example, referring to FIG. 3, relay node 360 may use the repetition configuration information received from base station 350 to determine a valid set of subframes (e.g., $Y_{ch}$) for transmitting and/or repeating transmissions using backhaul link 362 (e.g., DL 364 and UL 366) and/or access link 322 (e.g., DL 324 and UL 326). Further, relay node 360 may determine a valid set of subframes that may be used by UE 320 for communicating with base station 350 via direct link 382. In addition, relay node 360 may signal the repetition configuration information to the UE 320.

At 718, the relay node may switch from an access link operation to a backhaul link operation in using the determined at least one symbol or the at least one subframe. For example, referring to FIG. 3, hen relay node 360 is configured for HD operations, one or two (e.g., at least one) symbols in one or more subframes or one or more subframes may not be available for transmitting and/or receiving via the backhaul link or the access link to allow time for switching between the backhaul link and the access link. However, in an additional aspect, the exclusion of the first one or two symbols may not be required for every subframe. The relay node 360 may signal to the UE 320 which symbol(s) and/or subframes are unavailable for UL transmissions 326. Referring to FIG. 5, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

At 720, the relay node may switch from the backhaul link operation to the access link operation using the at least one symbol or the at least one subframe. For example, referring to FIG. 3, when relay node 360 is configured for HD operations, one or two (e.g., at least one) symbols in one or more subframes or one or more subframes may not be available for transmitting and/or receiving via the backhaul link or the access link to allow time for switching between the backhaul link and the access link. However, in an additional aspect, the exclusion of the first one or two symbols may not be required for every subframe. The relay node 360 may signal to the UE 320 which symbol(s) and/or subframes are unavailable for UL transmissions 326. Referring to FIG. 5, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

Figure 8:
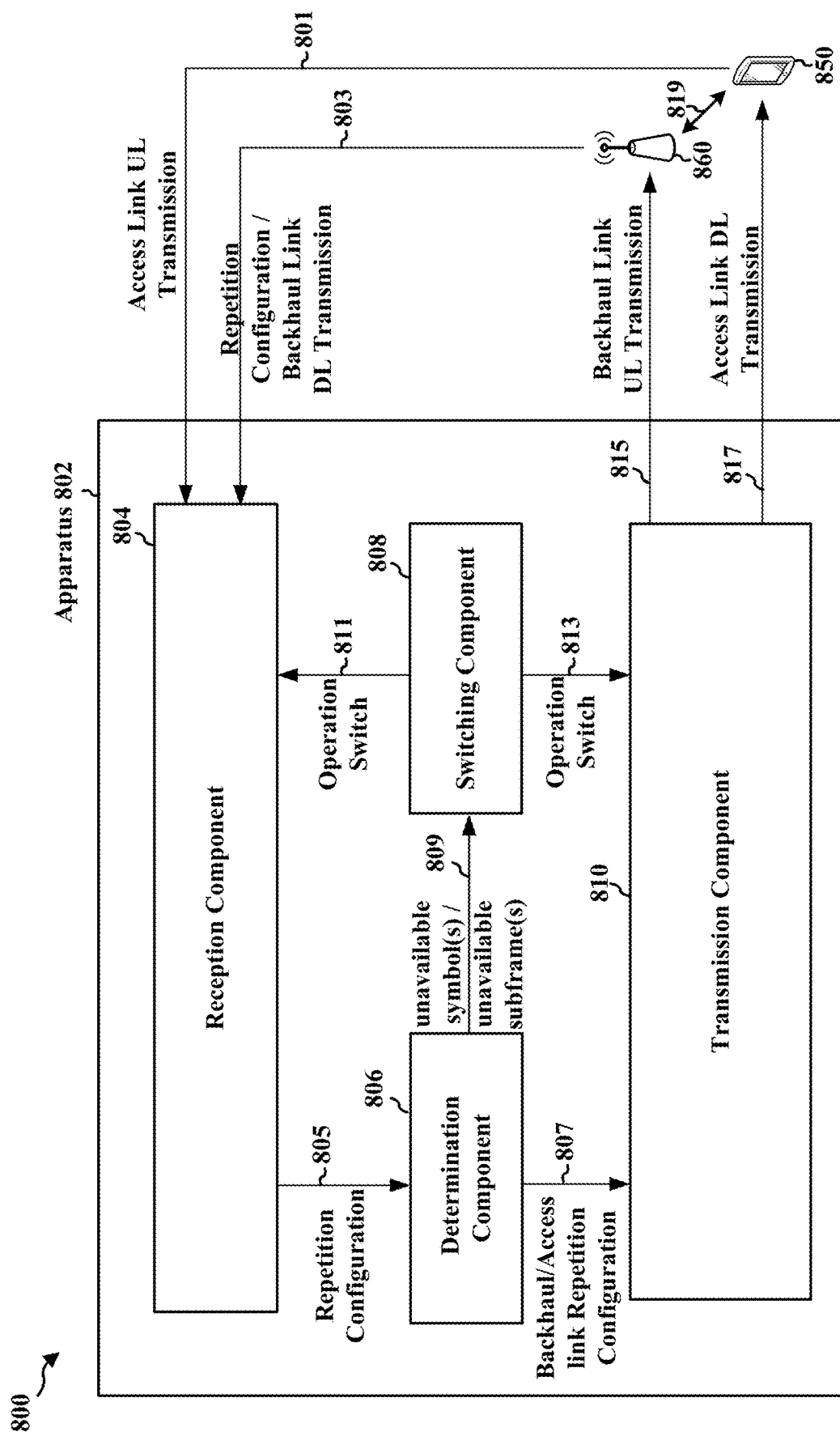
FIG. 8 is a conceptual data flow diagram illustrating the data flow between different means/components in an example apparatus.

FIG. 8 is a conceptual data flow diagram 800 illustrating the data flow between different means/components in an exemplary apparatus 802. The apparatus 802 may be an relay node (e.g., relay node 360/802') in communication with a UE 850 and a base station 860. In one aspect, the apparatus 802 may be an eMTC relay node, an NB-IoT relay node, and/or an HD relay node. In another aspect, the UE 860 may be an eMTC UE and/or an NB-IoT UE. The apparatus 802 may include a reception component 804 that receives repetition configuration information 803 from base station 860. In one aspect, reception component 804 may receive the repetition configuration information in an SIB, a relay node-specific configuration, or a combination thereof, from the base station 860. In another aspect, the repetition configuration information 803 received at reception component 804 may include information related to one or more a set of valid subframe for use in communication via one or more of the backhaul link or the access link, a set of narrowband frequency channels, frequency hopping parameters, or repetition levels. In one aspect, the repetition levels may be associated with at least one of a downlink relay control channel, a downlink relay shared channel, an uplink relay control channel, or an uplink relay shared channel. Reception component 804 may send a signal 805 related to the repetition configuration information to determination component 806. Determination component 806 may determine at least one of a backhaul repetition configuration for a backhaul link or an access link repetition configuration for an access link at the relay node based at least on the repetition configuration received from the base station 860. In one aspect, the determination component 806 may determine a first repetition level corresponding to the backhaul repetition configuration that is different from a second repetition level corresponding to the access link repetition configuration. Additionally and/or alternatively, determination component 806 may determine a direct link repetition configuration associated with communications 819 between the base station 860 and UE 850. Determination component 806 may send a signal 807 associated with the backhaul link repetition configuration and/or the access link repetition configuration to transmission component 810. In one aspect, the UE 850 may be in direct communication with the base station. In another aspect, determination component 806 may determine that the direct link 819 repetition configuration is different than the backhaul repetition configuration. Determination component 806 may determine at least one of a first set of subframes for the backhaul link or a second set of subframes for the access link based at least on the information associated with the set of valid subframes. For example, determination component 806 may determine the second set of subframes by determining a third set of subframes for an access link DL transmission 817 from a transmission component 810 of the apparatus 802 to UE 850. Further, determination component 806 may determine the second set of subframes by determining a fourth set of subframes for an access link UL transmission 801 received from the UE 850. In addition, determination component 806 may determine at least one symbol or at least one subframe not available for use in communicating over at least one of the backhaul link 803, 815 or the access link 801, 817. In one aspect, determination component 806 may send a signal 809 associated with one or more unavailable symbols and/or unavailable subframes to switching component 808. Switching component 808 may switch from an access link operation to a backhaul link operation based on the determined at least one symbol or the at least one subframe or from the backhaul link operation to the access link operation based on the at least one symbol or the at least one subframe. In one aspect, switching component 808 may send a signal 811, 813 to the reception component 804 and/or the transmission component 810 as an indication of the operation switch. Based on the determined symbol and/or subframes unavailable for use in communicating via the access link 801, 817 and/or the backhaul link 803, 815, the reception component 804/transmission component 810 may communicate with the UE 850 and/or the base station 860 using the access link 801, 817 and/or backhaul link 803, 815.

The apparatus may include additional components that perform each of the blocks of the algorithm in the aforementioned flowcharts of FIGS. 7A and 7B. As such, each block in the aforementioned flowcharts of FIGS. 7A and 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
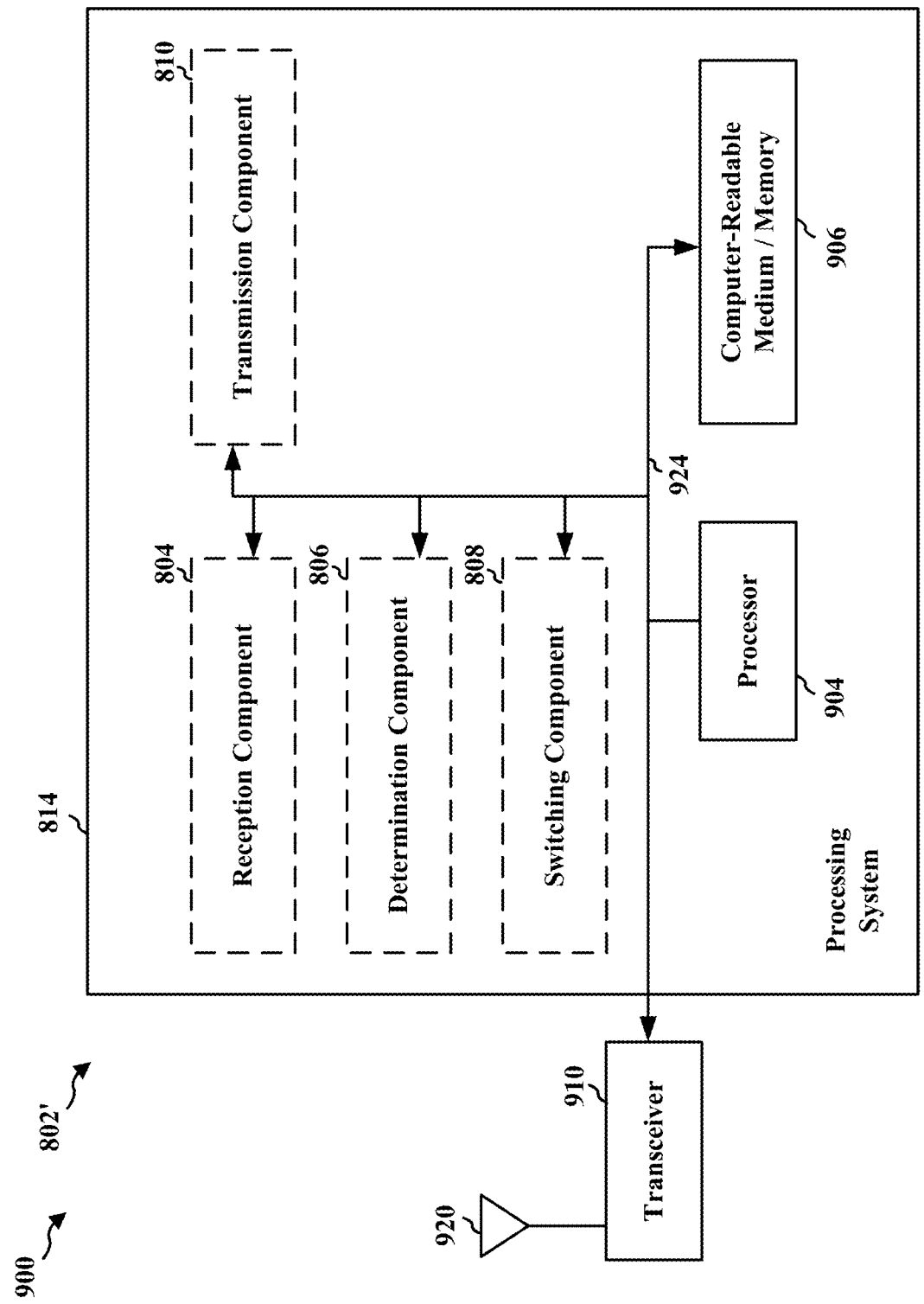
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/ memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the base station 210 and may include the memory 276 and/or at least one of the TX processor 216, the RX processor 270, and the controller/ processor 275.

In one configuration, the apparatus 802/802' for wireless communication may include means for receiving, at a relay node, repetition configuration information from a base station in communication with the relay node. In one aspect, the relay node may be an eMTC node or an NB-IoT node. In another aspect, the repetition configuration information may include information related to one or more a set of valid subframe for use in communication via one or more of the backhaul link or the access link, a set of narrowband frequency channels, frequency hopping parameters, or repetition levels. In a further aspect, the relay node may be a half-duplex relay node. In a further aspect, the repetition configuration information may be received in an SIB, a relay node-specific configuration, or a combination thereof. In another configuration, the apparatus 802/802' for wireless communication may include means for determining at least one of a backhaul repetition configuration for a backhaul link or an access link repetition configuration for an access link at the relay node based at least on the repetition configuration received from the base station. In an aspect, a first repetition level corresponding to the backhaul repetition configuration may be different from a second repetition level corresponding to the access link repetition configuration. In another aspect, the repetition levels may be associated with at least one of a downlink relay control channel, a downlink relay shared channel, an uplink relay control channel, or an uplink relay shared channel. In an further configuration, the apparatus 802/802' for wireless communication may include means for determining a direct link repetition configuration associated with communications between the base station and a UE. In an aspect, the UE may be one of an eMTC UE or an NB-IoT UE in direct communication with the base station. In another aspect, the determined direct link repetition configuration may be different than the backhaul repetition configuration. In another configuration, the apparatus 802/802' for wireless communication may include means for determining at least one of a first set of subframes for the backhaul link of the relay node or a second set of subframes for the access link of the relay node based at least on the information associated with the set of valid subframes. In an aspect, the means for determining the second set of subframes may be configured to determine a third set of subframes for a downlink communication from the relay node to a UE. In another aspect, the means for determining the second set of subframes may be configured to determine a fourth set of subframes for an uplink communication to the relay node from the UE. In an aspect, the UE may be an eMTC UE or an NB-IoT UE. In another configuration, the apparatus 802/802' for wireless communication may include means for determining at least one symbol or at least one subframe not available for use in communicating over at least one of the backhaul link or the access link. In one configuration, the apparatus 802/802' for wireless communication may include means for communicating via the backhaul link or the access link using available symbols or available subframes. In a further configuration, the apparatus 802/802' for wireless communication may include means for switching from an access link operation to a backhaul link operation based on the determined at least one symbol or the at least one subframe. In another configuration, the apparatus 802/802' for wireless communication may include means for switching from the backhaul link operation to the access link operation based on the at least one symbol or the at least one subframe. The aforementioned means may be one or more of the aforementioned components of the apparatus 802 and/or the processing system 914 of the apparatus 802' configured to perform the functions recited by the aforementioned means. As described supra, the processing system 914 may include the TX Processor 216, the RX Processor 270, and the controller/processor 275. As such, in one configuration, the aforementioned means may be the TX Processor 216, the RX Processor 270, and the controller/ processor 275 configured to perform the functions recited by the aforementioned means.

Figure 10A:
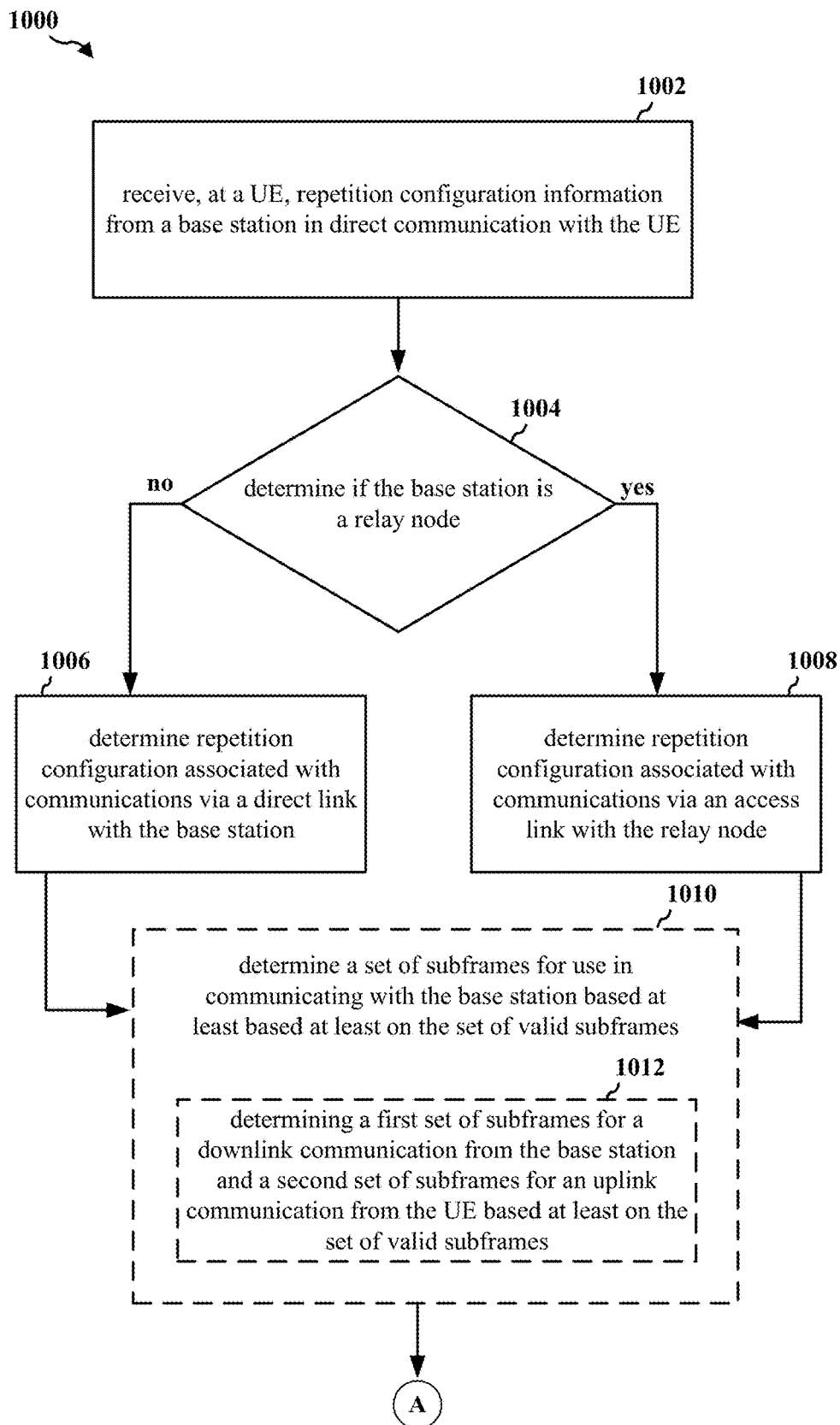
FIGS. 10A and 10B are a flow chart illustrating another method of wireless communications at a user equipment in accordance with one aspect of the present disclosure.
Figure 10B:
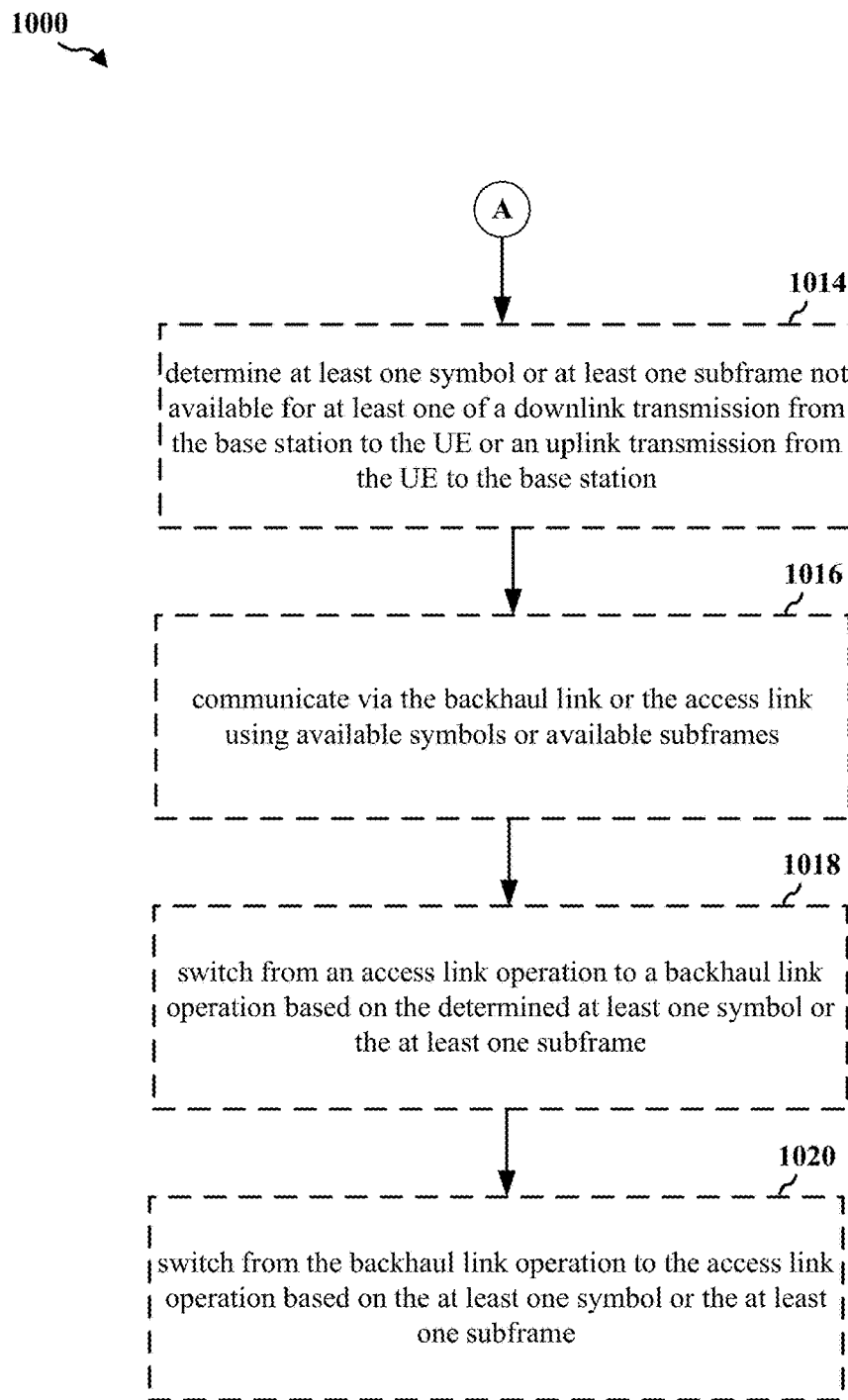

FIGS. 10A and 10B are a flowchart 1000 of a method of wireless communication. The method may be performed by a UE (e.g., the UE 320, the apparatus 1102/1102'). Operations indicated with dashed lines represent optional operations for various aspects of the disclosure.

As seen in FIG. 10A, at 1002, the UE may receive repetition configuration information from a base station in direct communication with the UE. In an aspect, the repetition configuration information may be related to one or more of a set of valid subframes, a set of narrow bands, hopping parameters, or repetition levels for use in communicating with the base station. In another aspect, the set of valid subframes, the set of narrow bands, the hopping parameters, or the repetition levels are received in a SIB. For example, referring to FIG. 3, the repetition configuration information may be received by relay node 360 in a relay node specific configuration message over-the-air or over backhaul link 362, or in combination with an SIB. Additionally and/or alternatively, the repetition configuration information may be received at UE 320 from base station 350 via direct link 382. In an aspect, the repetition configuration information received by UE 320 via direct link 382 may be used for communications with base station 350 or relay node 360. In one aspect, repetition configuration information for direct link 382 may be different than the backhaul repetition configuration for the backhaul link 362.

At 1004, the UE may determine if the base station is a relay node. For example, referring to FIG. 3, if relay node 360 is an L3 relay node, the relay node 360 may have a network identity (e.g., similar to a regular network base station) and therefore be non-transparent to the UE 320. In one aspect, the UE 320 may determine that relay node 360 is a relay node and not a direct link base station (e.g., base station 350) based on the network identity.

If it is determined that the base station is not a relay node, at 1006, the UE may determine repetition configuration associated with communications via a direct link with the base station. For example, referring to FIG. 3, the repetition configuration information may be received at UE 320 from base station 350 via direct link 382. In an aspect, the repetition configuration information received by UE 320 via direct link 382 may be used for communications with base station 350 or relay node 360. In one aspect, repetition configuration information for direct link 382 may be different than the backhaul repetition configuration for the backhaul link 362.

Alternatively, if it is determined that the base station is a relay node, at 1008, the UE may determine repetition configuration associated with communications via an access link with the relay node. In an aspect, the repetition configuration may be further determined based on whether the UE is an eMTC UE or a NB-IoT UE. In another aspect, the repetition configuration may be further determined based on whether the UE is operating in-band or in a guard band. In a further aspect, the repetition configuration may be further determined based on whether the base station is a half-duplex relay node, or a limited bandwidth relay node, or a combination thereof. For example, referring to FIG. 3, relay node 360 may use the repetition configuration information received from base station 350 to determine a valid set of subframes (e.g., $Y_{ch}$) for transmitting and/or repeating transmissions using backhaul link 362 (e.g., DL 364 and UL 366) and/or access link 322 (e.g., DL 324 and UL 326). In one aspect, the $Y_{ch}$ subframes defined for a TDD UE may be used or adapted for a FDD HD relay node because the partitioning of backhaul and access links makes a FDD relay node operate similar to a TDD node. In an additional aspect, the relay node 360 may use a 10 ms based resource partitioning for FDD instead of an 8 ms resource partitioning, and a 10 ms HARQ round trip time (RTT) may also be considered in the backhaul link 362 and/or access link 322. For eMTC, where UE 320 is configured with one of coverage enhancement (CE) mode A or CE mode B, the following values of $Y_{ch}$ may be defined: CE mode A: FDD: $Y_{ch}$={1, 2, 4, 8}, TDD: $Y_{ch}$={1, 5, 10, 20}; and CE mode B: FDD: $Y_{ch}$={2, 4, 8, 16}, TDD: $Y_{ch}$={5, 10, 20, 40}. The relay node 360 may signal to the UE 320 information associated with a valid set of subframes that may be used for DL or UL transmissions (e.g., TB transmissions) on the access link 322. In one aspect, the information associated with the valid set of subframes may be included in the repetition configuration information signaled by the base station 350. The valid set of subframes may be used by the UE 320 and/or relay node 360 for repeating a transmission or sending a new transmission. In an aspect, the valid set of subframes for DL and UL transmissions on the access link 322 (e.g., transmissions between the relay node 360 and the UE 320) may be configured based on a subframe configuration associated with the backhaul link 362 (e.g., transmission between the base station 350 and the relay node 360). In other words, a repetition level corresponding to a backhaul repetition configuration may be different from a repetition level corresponding to an access link repetition configuration. The difference in repetition levels between the backhaul link 362 and the access link 322 may be due to HARQ processes that are performed for DL transmissions 354 received at the relay node 360.

At 1010, the UE may determine a set of subframes for use in communicating with the base station based at least based at least on the set of valid subframes. For example, referring to FIG. 4, as the HARQ process may be configured with the periodicity of 8 ms (e.g., and each subframe being 1 ms in duration), the next subframe that may be configured for a DL transmission 364 associated with the HARQ process on the backhaul link 362 is subframe 9 419. However, as discussed above, since subframe 9 419 may not be configured as an MBSFN subframe, subframe 9 419 may not be used for sending a backhaul DL transmission 364. As a result, the next subframe that may be configured for the HARQ process is subframe 7 of frame 2 427 (e.g., based on a configured periodicity of 8 ms). Since the HARQ response may be sent at the n+4$^{th}$ subframe, the relay node 360 may send a HARQ response in subframe 1 472 of frame 3 403. Thus, subframe 1 472 in frame 3 403 may be unavailable to UE 320 for use in sending an access link UL transmission. Referring to FIG. 5, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and thus backhaul DL HARQ transmissions. Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., 1 ms), if subframes 4 or 9 are used for the backhaul link 362 or the access link 322, two adjacent subframes may not be used for another one of the backhaul link 362 or the access link 322. In another example aspect, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

At 1012, the UE may determine a set of subframes for use in communicating with the base station by determining a first set of subframes for a downlink communication from the base station and a second set of subframes for an uplink communication from the UE based at least on the set of valid subframes. For example, referring to FIG. 4, as the HARQ process may be configured with the periodicity of 8 ms (e.g., and each subframe being 1 ms in duration), the next subframe that may be configured for a DL transmission 364 associated with the HARQ process on the backhaul link 362 is subframe 9 419. However, as discussed above, since subframe 9 419 may not be configured as an MBSFN subframe, subframe 9 419 may not be used for sending a backhaul DL transmission 364. As a result, the next subframe that may be configured for the HARQ process is subframe 7 of frame 2 427 (e.g., based on a configured periodicity of 8 ms). Since the HARQ response may be sent at the n+4$^{th}$ subframe, the relay node 360 may send a HARQ response in subframe 1 472 of frame 3 403. Thus, subframe 1 472 in frame 3 403 may be unavailable to UE 320 for use in sending an access link UL transmission. Referring to FIG. 5, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and thus backhaul DL HARQ transmissions. Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., 1 ms), if subframes 4 or 9 are used for the backhaul link 362 or the access link 322, two adjacent subframes may not be used for another one of the backhaul link 362 or the access link 322. In another example aspect, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

As seen in FIG. 10B, at 1014, the UE may determine at least one symbol or at least one subframe not available for at least one of a downlink transmission from the base station to the UE or an uplink transmission from the UE to the base station. For example, referring to FIG. 3, when relay node 360 is configured for HD operations, one or two (e.g., at least one) symbols in one or more subframes may not be available for transmitting and/or receiving via the backhaul link or the access link to allow time for switching between the backhaul link and the access link. However, in an additional aspect, the exclusion of the first one or two symbols may not be required for every subframe. The relay node 360 may signal to the UE 320 which symbol(s) in which subframes are unavailable for UL transmissions 326. In addition, referring to FIG. 5, multiple HARQ processes may be configured for the backhaul link 362 at the relay node 360. For example, subframe 1 511, subframe 2 512, subframe 3 513, subframe 6 516, subframe 7 517 and/or subframe 8 518 of frame 1 501 are configured as backhaul link 364 DL subframes with a corresponding HARQ response transmitted at backhaul link UL n+4$^{th}$ subframe. That is, subframe 1 511, subframe 2 512, subframe 3 513, subframe 4 516, subframe 5 517, and/or subframe 6 518 may be configured as downlink subframes of the backhaul link 362 and the HARQ response messages may be transmitted on the access link 322 at UL subframe 0 550, subframe 1 551, subframe 2 552, subframe 5 555, subframe 6 556, and/or subframe 7 557. Although, the HARQ processes may be configured with a periodicity of 8 ms, DL subframe 0, DL subframe 4, DL subframe 5, and DL subframe 9 may not be used for MBSFN transmissions and thus backhaul DL HARQ transmissions. Further, for the access link, only subframe 0 510, subframe 4 514, subframe 5 515, and subframe 9 519 may be possibly used as access link 322 DL subframes and subframe 3 553, subframe 4 554, subframe 8 558, and subframe 9 559 may be used as access link 322 UL subframes. That is, subframe 4 (514, 554) and subframe 9 (519, 559) may be used for either access link 322 DL transmission or access link 322 UL transmissions, subframe 0 510 and subframe 5 515 may be used for access link 322 DL transmissions, and/or subframe 3 553 and subframe 8 558 may be used for access link 322 UL transmissions. Furthermore, as UEs that operate in HD mode may need time for switching (e.g., 1 ms), if subframes 4 or 9 are used for the backhaul link 362 or the access link 322, two adjacent subframes may not be used for another one of the backhaul link 362 or the access link 322. In another example aspect, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

At 1016, the UE may communicate via the backhaul link or the access link using available symbols or available subframes. For example, referring to FIG. 3, relay node 360 may use the repetition configuration information received from base station 350 to determine a valid set of subframes (e.g., $Y_{ch}$) for transmitting and/or repeating transmissions using backhaul link 362 (e.g., DL 364 and UL 366) and/or access link 322 (e.g., DL 324 and UL 326). Further, relay node 360 may determine a valid set of subframes that may be used by UE 320 for communicating with base station 350 via direct link 382. In addition, relay node 360 may signal the repetition configuration information to the UE 320.

At 1018, the UE may switch from an access link operation to a backhaul link operation based on the determined at least one symbol or the at least one subframe. For example, referring to FIG. 3, hen relay node 360 is configured for HD operations, one or two (e.g., at least one) symbols in one or more subframes or one or more subframes may not be available for transmitting and/or receiving via the backhaul link or the access link to allow time for switching between the backhaul link and the access link. However, in an additional aspect, the exclusion of the first one or two symbols may not be required for every subframe. The relay node 360 may signal to the UE 320 which symbol(s) and/or subframes are unavailable for UL transmissions 326. Referring to FIG. 5, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

At 1020, the UE may switch from the backhaul link operation to the access link operation based on the at least one symbol or the at least one subframe. For example, referring to FIG. 3, hen relay node 360 is configured for HD operations, one or two (e.g., at least one) symbols in one or more subframes or one or more subframes may not be available for transmitting and/or receiving via the backhaul link or the access link to allow time for switching between the backhaul link and the access link. However, in an additional aspect, the exclusion of the first one or two symbols may not be required for every subframe. The relay node 360 may signal to the UE 320 which symbol(s) and/or subframes are unavailable for UL transmissions 326. Referring to FIG. 5, the unavailability of subframes (e.g., due to partitioning, MBSFN restriction, and/or switching time) may cause the network to carefully allocate (e.g., plan, choose, etc.) subframes for the DL operations and the UL operations of the access link 322 for eMTC and NB-IoT UEs. For instance, it may be desirable to utilize the unavailable subframes to facilitate the switching for eMTC/NB-IoT UEs.

Figure 11:
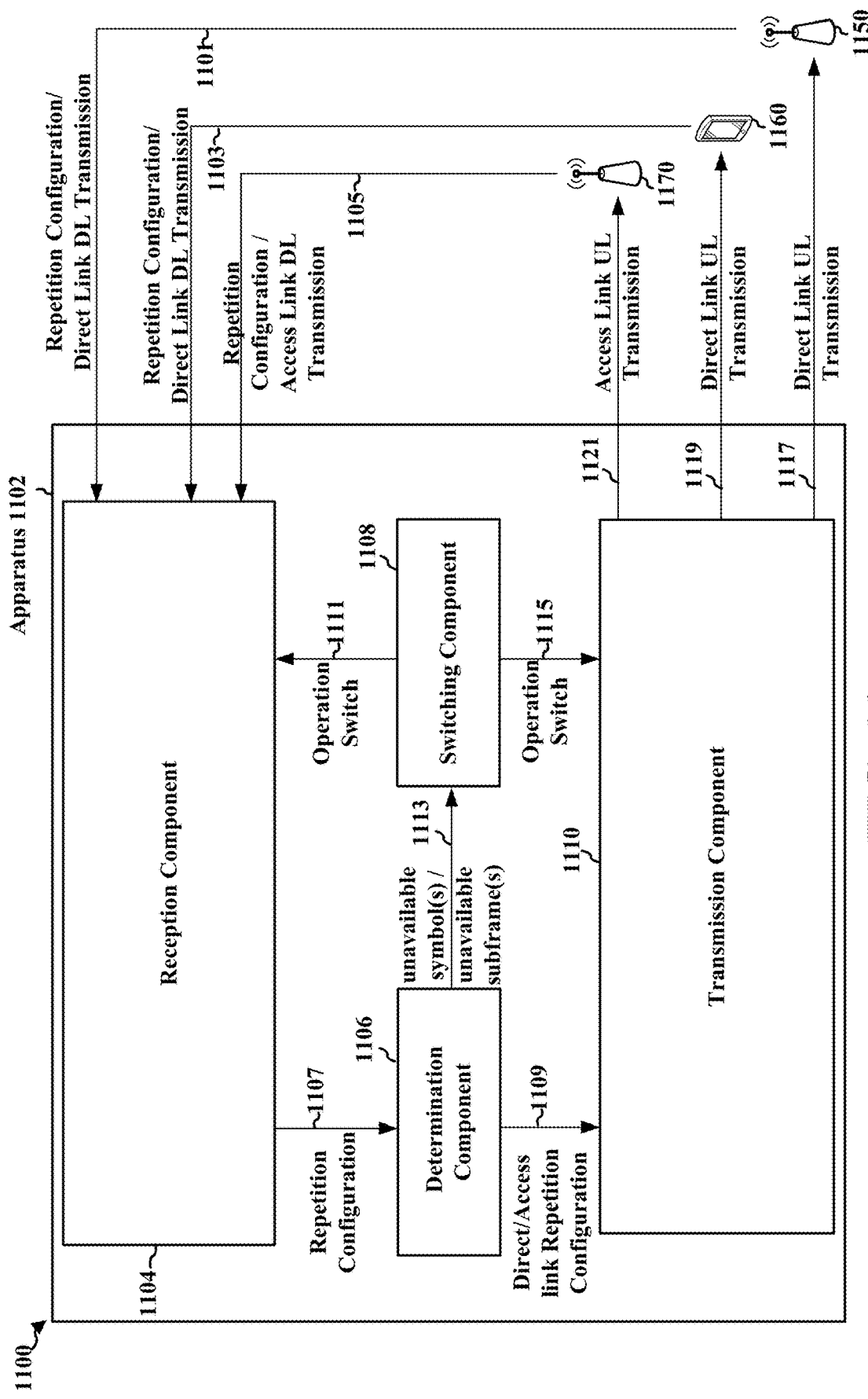
FIG. 11 is a conceptual data flow diagram illustrating the data flow between different means/components in an example apparatus.

FIG. 11 is a conceptual data flow diagram 1100 illustrating the data flow between different means/components in an exemplary apparatus 1102. The apparatus may be a UE (e.g., UE 320, 1102') in communication with one or more of a base station 1150, a UE 1160, or a relay node 1170. The apparatus may include a reception component 1104 that receives repetition configuration information and/or a network identity 1101, 1103, 1105 from the base station 1150, the UE 1160, and/or the relay node 1170. In an aspect, the repetition configuration information is received in an SIB from the base station 1150 and/or relay node 1170. In one aspect, the reception component 1104 may send a signal 1107 associated with the repetition configuration information and/or network identity of the base station 1150 or the relay node 1170 to determination component 1106. Determination component 1106 may determine whether the repetition configuration information is received from the base station 1150, the UE 1160, and/or the relay node 1170. For example, the determination may be based on the network identity. In another aspect, determination component 1106 may determine a repetition configuration for communication between the base station 1150, the UE 1160, and/or the relay node 1170 based at least on the repetition configuration information. In an aspect, the repetition configuration information may be related to one or more of a set of valid subframes, a set of narrow bands, hopping parameters, or repetition levels for use in communicating with the base station. In a further aspect, the determination component 1106 may further determine the repetition configuration based on whether the apparatus is an eMTC UE or a NB-IoT UE. In addition, determination component 1106 may further determine the repetition configuration based on whether the UE is operating in-band or in a guard band. Determination component 1106 may further determine the repetition configuration based on whether the base station is a half-duplex relay node, or a limited bandwidth relay node, or a combination thereof. In another aspect, determination component 1106 may determine a set of subframes for use in communicating with the base station based at least based at least on the set of valid subframes. In an aspect, determination component may determine the set of subframes by determining a first set of subframes for a downlink communication from the base station and a second set of subframes for an uplink communication from the UE based at least on the set of valid subframes. Further, determination component 1106 may determine at least one symbol or at least one subframe not available for at least one of a downlink/uplink transmission to/from the base station 1150, the UE 1160, and/or the relay node 1170. Determination component 1106 may send a signal 1113 associated with the unavailable symbol(s) and/or subframe(s) to switching component 1108. Determination component 1106 may send a signal 1109 associated with the repetition configuration associated with a direct link and/or an access link to transmission component 1110. Switching component 1108 may switch from an access link operation to a backhaul link operation based on the determined at least one symbol or the at least one subframe or from the backhaul link operation to the access link operation based on the at least one symbol or the at least one subframe. In one aspect, switching component 1108 may send a signal 1111, 1115 to the reception component 1104 and/or the transmission component 1110 as an indication of the operation switch. Based on the determined symbol and/or subframes unavailable for use in communicating via the access link 1105, 1121 and/or the direct link 1101, 1103, 1117, 1119, the reception component 1104/transmission component 1110 may communicate with the base station 1150, the UE 1160, and/or the relay node 1170.

The apparatus may include additional components that perform each of the blocks of the algorithm in the aforementioned flowcharts of FIGS. 10A and 10B. As such, each block in the aforementioned flowcharts of FIGS. 10A and 10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
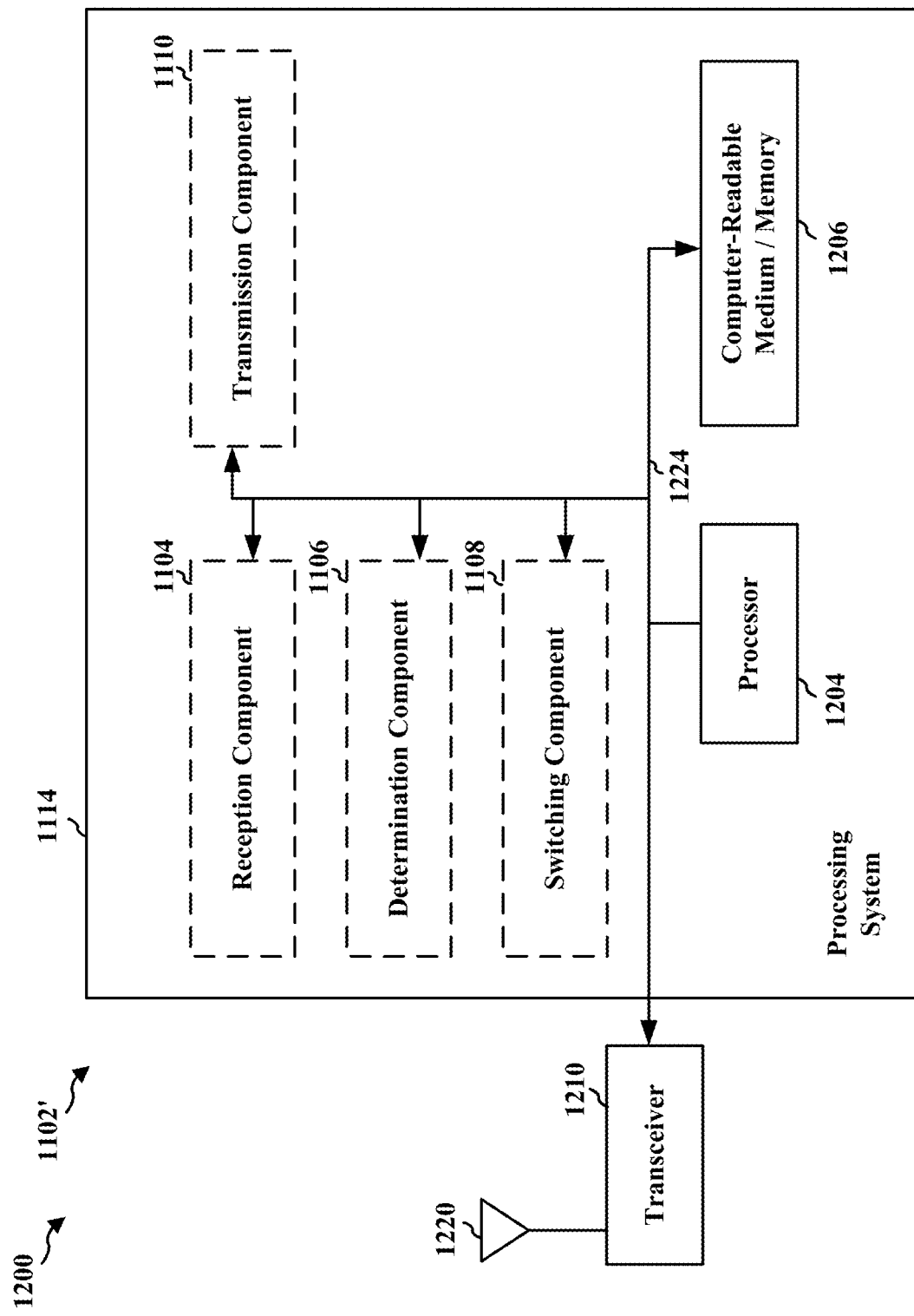
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the UE 250 and may include the memory 260 and/or at least one of the TX processor 268, the RX processor 256, and the controller/processor 259.

In one configuration, the apparatus 1102/1102' for wireless communication may include means for receiving, at a UE, repetition configuration information from a base station in direct communication with the UE. In an aspect, the repetition configuration information may be received in a SIB. In another aspect, the repetition configuration information may be related to one or more of a set of valid subframes, a set of narrow bands, hopping parameters, or repetition levels for use in communicating with the base station. In another configuration, the apparatus 1102/1102' for wireless communication may include means for determining whether the base station is a relay node. In a further configuration, the apparatus 1102/1102' for wireless communication may include means for determining a repetition configuration for communication between the base station and the UE based at least on the repetition configuration information and whether the base station is a relay node. In an aspect, the repetition configuration may be further determined based on whether the UE is an eMTC UE or a NB-IoT UE. In another aspect, the repetition configuration may be further determined based on whether the UE is operating in-band or in a guard band. In a further aspect, the repetition configuration may be further determined based on whether the base station is a half-duplex relay node, or a limited bandwidth relay node, or a combination thereof. In another configuration, the apparatus 1102/1102' for wireless communication may include means for determining a set of subframes for use in communicating with the base station based at least based at least on the set of valid subframes. In an aspect, the means for determining the set of subframes may be configured to determine a first set of subframes for a downlink communication from the base station and a second set of subframes for an uplink communication from the UE based at least on the set of valid subframes. In one configuration, the apparatus 1102/1102' for wireless communication may include means for determining at least one symbol or at least one subframe not available for at least one of a downlink transmission from the base station to the UE or an uplink transmission from the UE to the base station. In another configuration, the apparatus 1102/1102' for wireless communication may include means for communicating via the backhaul link or the access link using available symbols or available subframes. In a further configuration, the apparatus 1102/1102' for wireless communication may include means for switching from an access link operation to a backhaul link operation based on the determined at least one symbol or the at least one subframe. In another configuration, the apparatus 1102/1102' for wireless communication may include means for switching from the backhaul link operation to the access link operation based on the at least one symbol or the at least one subframe.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method of wireless communications, comprising:
receiving, at a user equipment (UE), repetition configuration information from a base station in direct communication with the UE;
determining whether the base station is a relay node; and determining a repetition configuration for an access link or a direct link for communication between the base station and the UE based at least on the repetition configuration information and whether the base station is the relay node.

2. The method of claim 1, wherein the repetition configuration is further determined based on whether the UE is an enhanced machine type communications (eMTC) UE or a narrow band Internet of things (NB-IoT) UE.

3. The method of claim 1, wherein the repetition configuration is further determined based on whether the UE is operating in-band or in a guard band.

4. The method of claim 1, wherein the repetition configuration is further determined based on whether the base station is a half-duplex relay node, or a limited bandwidth relay node, or a combination thereof.

5. The method of claim 1, wherein the repetition configuration information is related to one or more of a set of valid subframes, a set of narrow bands, hopping parameters, or repetition levels for use in communicating with the base station.

6. The method of claim 5, wherein the repetition configuration information is received in a system information block (SIB).

7. The method of claim 5, further comprising:
determining a set of subframes for use in communicating with the base station based at least based at least on the set of valid subframes.

8. The method of claim 7, wherein the determining the set of subframes further comprises:
determining a first set of subframes for a downlink communication from the base station and a second set of subframes for an uplink communication from the UE based at least on the set of valid subframes.

9. The method of claim 8, further comprising:
determining at least one symbol or at least one subframe not available for at least one of a downlink transmission from the base station to the UE or an uplink transmission from the UE to the base station; and
communicating via a backhaul link or the access link using available symbols or available subframes.

10. The method of claim 9, further comprising:
switching from an access link operation to a direct link operation based on the determined at least one symbol or the at least one subframe; or
switching from the direct link operation to the access link operation based on the at least one symbol or the at least one subframe.

11. An apparatus for wireless communication, comprising:
a memory; and
at least one processor coupled to the memory and configured to:
receive, at a user equipment (UE), repetition configuration information from a base station in direct communication with the UE;
determine whether the base station is a relay node; and
determine a repetition configuration for an access link or a direct link for communication between the base station and the UE based at least on the repetition configuration information and whether the base station is the relay node.

12. The apparatus of claim 11, wherein the at least one processor is further configured to:
determine a set of subframes for use in communicating with the base station based at least based at least on a set of valid subframes, wherein the at least one processor is configured to determine the set of subframes by determining a first set of subframes for a downlink communication from the base station and a second set of subframes for an uplink communication from the UE based at least on the set of valid subframes;
determine at least one symbol or at least one subframe not available for at least one of a downlink transmission from the base station to the UE or an uplink transmission from the UE to the base station; and
communicate via a backhaul link or the access link using available symbols or available subframes.

13. The apparatus of claim 12, wherein the at least one processor is further configured to:
switch from an access link operation to a direct link operation based on the determined at least one symbol or the at least one subframe; or
switch from the direct link operation to the access link operation based on the at least one symbol or the at least one subframe.

14. An apparatus for wireless communication, comprising:
means for receiving, at a user equipment (UE), repetition configuration information from a base station in direct communication with the UE;
means for determining whether the base station is a relay node; and
means for determining a repetition configuration for an access link or a direct link for communication between the base station and the UE based at least on the repetition configuration information and whether the base station is the relay node.

15. The apparatus of claim 14, wherein the repetition configuration is further determined based on whether the UE is an enhanced machine type communications (eMTC) UE or a narrow band Internet of things (NB-IoT) UE.

16. The apparatus of claim 14, wherein the repetition configuration is further determined based on whether the UE is operating in-band or in a guard band.

17. The apparatus of claim 14, wherein the repetition configuration is further determined based on whether the base station is a half-duplex relay node, or a limited bandwidth relay node, or a combination thereof.

18. The apparatus of claim 14, wherein the repetition configuration information is related to one or more of a set of valid subframes, a set of narrow bands, hopping parameters, or repetition levels for use in communicating with the base station.

19. The apparatus of claim 18, wherein the repetition configuration information is received in a system information block (SIB).

20. The apparatus of claim 18, further comprising:
means for determining a set of subframes for use in communicating with the base station based at least based at least on the set of valid subframes.

21. The apparatus of claim 20, wherein the determining the set of subframes further comprises:
means for determining a first set of subframes for a downlink communication from the base station and a second set of subframes for an uplink communication from the UE based at least on the set of valid subframes.

22. The apparatus of claim 21, further comprising:
means for determining at least one symbol or at least one subframe not available for at least one of a downlink transmission from the base station to the UE or an uplink transmission from the UE to the base station; and means for communicating via a backhaul link or the access link using available symbols or available subframes.

23. The apparatus of claim 22, further comprising:
means for switching from an access link operation to a direct link operation based on the determined at least one symbol or the at least one subframe; or
means for switching from the direct link operation to the access link operation based on the at least one symbol or the at least one subframe.

24. A non-transitory computer-readable medium storing computer executable code, the code when executed by a processor cause the processor to:
receive, at a user equipment (UE), repetition configuration information from a base station in direct communication with the UE;
determine whether the base station is a relay node; and
determine a repetition configuration for an access link or a direct link for communication between the base station and the UE based at least on the repetition configuration information and whether the base station is the relay node.

\* \* \* \* \*